(12) United States Patent
Nagata et al.

(10) Patent No.: US 11,634,166 B2
(45) Date of Patent: Apr. 25, 2023

(54) SUPPORT STRUCTURE FOR AIRBAG APPARATUS

(71) Applicant: TOYODA GOSEI CO., LTD., Kiyosu (JP)

(72) Inventors: Matsuo Nagata, Kiyosu (JP); Yuki Nonoyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/567,500

(22) Filed: Jan. 3, 2022

(65) Prior Publication Data

US 2022/0219749 A1 Jul. 14, 2022

(30) Foreign Application Priority Data

Jan. 8, 2021 (JP) .............................. JP2021-002094

(51) Int. Cl.
*B62D 1/11* (2006.01)
*B62D 1/10* (2006.01)
*B60R 21/203* (2006.01)

(52) U.S. Cl.
CPC .................. *B62D 1/11* (2013.01); *B62D 1/10* (2013.01); *B60R 21/2037* (2013.01)

(58) Field of Classification Search
CPC ..... B60R 21/2037; B60R 21/203; B62D 1/11; B62D 1/10; B62D 7/222
USPC ....................................................... 280/731
See application file for complete search history.

(56) References Cited

U.S. PATENT DOCUMENTS

| 8,556,292 | B2* | 10/2013 | Umemura | B62D 7/222 |
| | | | | 280/731 |
| 8,733,203 | B2* | 5/2014 | Kondo | B60Q 5/003 |
| | | | | 74/552 |
| 8,794,662 | B2* | 8/2014 | Ishii | B60R 21/2037 |
| | | | | 280/728.2 |
| 9,561,772 | B2* | 2/2017 | Andersson | B60R 21/2037 |
| 10,023,221 | B2* | 7/2018 | Obayashi | B62D 7/222 |
| 10,315,605 | B2* | 6/2019 | Ishii | B60R 21/2037 |
| 10,913,420 | B2* | 2/2021 | Ishii | B60R 21/2037 |
| 2010/0219621 | A1* | 9/2010 | Sasaki | B60Q 5/003 |
| | | | | 280/731 |

(Continued)

FOREIGN PATENT DOCUMENTS

| JP | 2014-141255 A | 8/2014 |
| JP | 2017-052433 A | 3/2017 |
| JP | 2017-065409 A | 4/2017 |

*Primary Examiner* — Paul N Dickson
*Assistant Examiner* — Caitlin Anne Miller
(74) *Attorney, Agent, or Firm* — Posz Law Group, PLC

(57) ABSTRACT

A support structure for an airbag apparatus includes an airbag apparatus having a bag holder, a supporting member having a shaft portion, a slider, an annular damper holder, and an annular elastic member. The shaft portion extends in a front-rear direction, while being passed through the bag holder. The shaft portion includes a flange at the rear end. The slider is fitted around the shaft portion to be slidable in the front-rear direction. The damper holder covers part of the slider in the front-rear direction. The elastic member includes protrusions that protrude rearward from the elastic member so as to contact the flange, thereby partially filling a gap between the elastic member and the flange. The protrusions extend radially with an axis of the supporting member serving as a center.

8 Claims, 13 Drawing Sheets

(56) References Cited

U.S. PATENT DOCUMENTS

| | | |
|---|---|---|
| 2013/0239739 A1 | 9/2013 | Miyahara et al. |
| 2017/0072985 A1 | 3/2017 | Ishii et al. |
| 2017/0144594 A1* | 5/2017 | Obayashi ............... B60Q 5/003 |
| 2021/0269080 A1* | 9/2021 | Kim ....................... B62D 7/222 |
| 2022/0080918 A1* | 3/2022 | Sasaki ................. B60R 21/2037 |

* cited by examiner

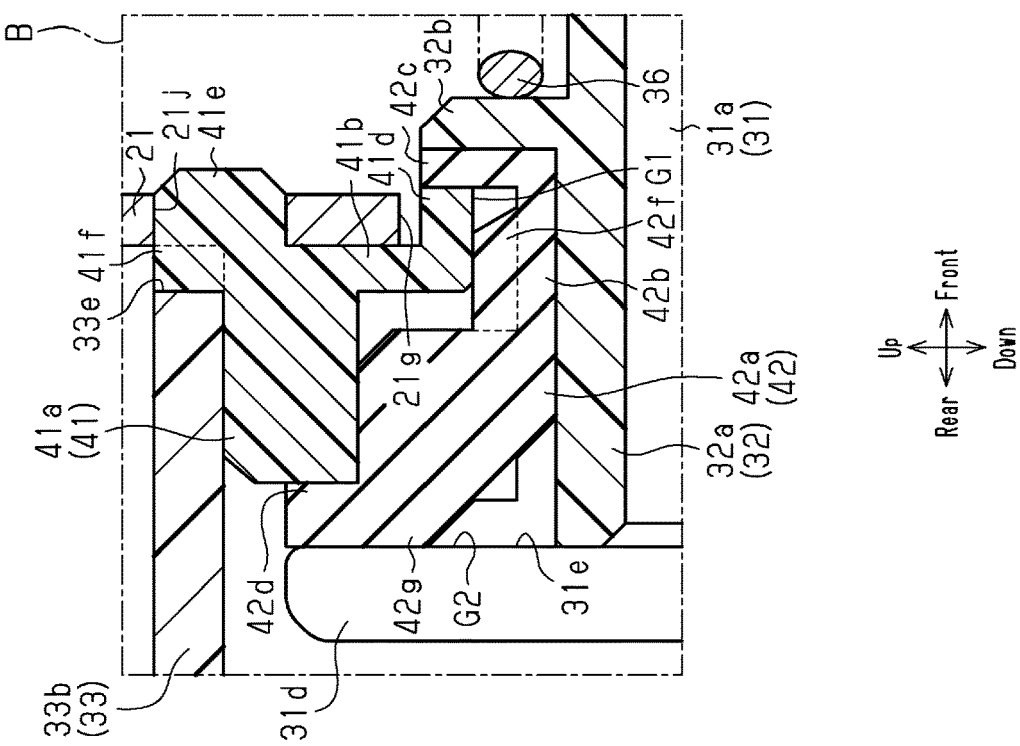

SUPPORT STRUCTURE FOR AIRBAG APPARATUS

BACKGROUND

1. Field

The present disclosure relates to a support structure for an airbag apparatus that allows an airbag apparatus to be supported by the metal core of the steering wheel in a vehicle such as a land vehicle.

2. Description of Related Art

For example, Japanese Laid-Open Patent Publication No. 2017-52433 discloses a structure in which, as shown in FIG. 20, an airbag apparatus 45 is used as the damper mass of a dynamic damper, and the airbag apparatus 45 is supported by a metal core 51 of a steering wheel 50. This support structure includes a supporting member 53, a slider 54, a damper holder 55, and an elastic member 56. The airbag apparatus 45 includes a bag holder 46 in its front portion.

The supporting member 53 includes a shaft portion 53a, which is passed through the bag holder 46 and extends in the front-rear direction. The supporting member 53 is attached to the metal core 51 at the front end of the shaft portion 53a. The shaft portion 53a includes a flange 53b at the rear end.

The slider 54 is fitted around the shaft portion 53a to be slidable in the front-rear direction.

The damper holder 55 is attached to the airbag apparatus 45 while covering part of the slider 54 in the front-rear direction.

The elastic member 56 is arranged between the slider 54 and the damper holder 55. The elastic member 56 includes protrusions 56a. The protrusions 56a partially fill a gap G3 between the outer circumference of the elastic member 56 and the damper holder 55. The protrusions 56a are spaced apart from each other in the circumferential direction of the elastic member 56. The elastic member 56 is formed such that the natural frequency of the elastic member 56 is the same as or close to the frequency required to suppress vibrations of the steering wheel 50.

In the above described support structure, the airbag apparatus 45 functions as the damper mass of a dynamic damper, and the elastic member 56 functions as the spring of the dynamic damper. Thus, if the steering wheel 50 vibrates in the up-down direction or the left-right direction, the elastic member 56 vibrates together with the airbag apparatus 45 while being elastically deformed at the natural frequency, which is the same as or close to the frequency required to suppress the vibrations of the steering wheel 50, thereby absorbing the vibration energy of the steering wheel 50. Such energy absorption suppresses the vibrations of the steering wheel 50.

When the airbag apparatus 45 starts to swing relative to the supporting member 53 in a direction indicated by the arrow A in FIG. 20, the protrusions 56a restrict the elastic member 56 from being elastically deformed due to the gap G3. Such restriction suppresses the swinging motion of the airbag apparatus 45 relative to the supporting member 53.

However, since there is a gap G4 between the rear end of the elastic member 56 and the flange 53b, the elastic member 56 can be elastically deformed by an amount corresponding to the gap G4. Thus, the airbag apparatus 45 has room for improvement in suppression of the above-described swinging motion.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a support structure for an airbag apparatus is provided. The support structure includes the airbag apparatus, a supporting member, a slider, a damper holder, and a annular elastic member. The airbag apparatus includes a bag holder in its front portion and functions as a damper mass of a dynamic damper. The supporting member includes a shaft portion. The shaft portion includes a flange at a rear end and extending in a front-rear direction while being passed through the bag holder. The supporting member is attached to a metal core of a steering wheel at a front end of the shaft portion. The slider is fitted around the shaft portion to be slidable in the front-rear direction. The damper holder is attached to the airbag apparatus while covering part in the front-rear direction of the slider. The annular elastic member is arranged between the slider and the damper holder and functions as a spring of the dynamic damper. The elastic member includes protrusions that protrude rearward from the elastic member so as to contact the flange, thereby partially filling a gap between the elastic member and the flange. The protrusions are spaced apart from each other in a circumferential direction of the elastic member. The protrusions extend radially with an axis of the supporting member serving as a center.

Other features and aspects will be apparent from the following detailed description, the drawings, and the claims.

BRIEF DESCRIPTION OF THE DRAWINGS

FIG. 13 is a side view of the elastic member shown in FIG. 9.

FIG. 14 is an enlarged partial side view showing section C in FIG. 13.

FIG. 15 is an enlarged vertical cross-sectional view showing section B in FIG. 11.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

The term "annular" as used in this description may refer to any structure that forms a loop, which is a continuous shape with no ends. "Annular" shapes include but are not limited to a circular shape, an elliptic shape, and a polygonal shape with sharp or rounded corners.

A support structure for an airbag apparatus of a land vehicle according to one embodiment will now be described with reference to FIGS. 1 to 18.

Figure 1:
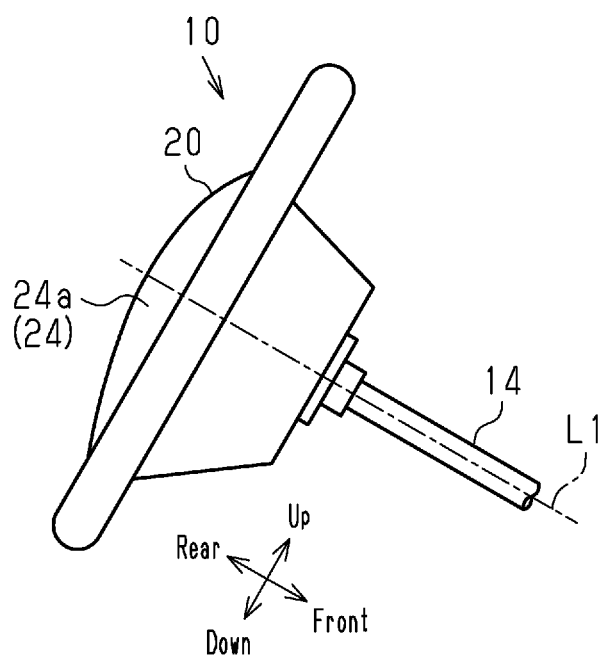
FIG. 1 is a side view of a steering wheel equipped with an airbag apparatus according to one embodiment.

As shown in FIG. 1, the land vehicle includes a steering shaft 14, which rotates about an axis L1. The axis L1 is inclined to be higher toward the rear end of the land vehicle. A steering wheel 10 is attached to the rear end of the steering shaft 14.

In the present embodiment, the axis L1 of the steering shaft 14 is used as a reference when describing each part of the steering wheel 10. The direction along the axis L1 will be referred to as a front-rear direction of the steering wheel 10. The direction that is orthogonal to the axis L1 and in which the steering wheel 10 is erected will be referred to as an up-down direction. Therefore, the front-rear direction and the up-down direction of the steering wheel 10 are slightly inclined relative to the front-rear direction (horizontal direction) and the up-down direction (vertical direction) of the land vehicle.

For purposes of illustration, the front-rear direction of the steering wheel 10 agrees with the horizontal direction, and the up-down direction of the steering wheel 10 agrees with the vertical direction in FIGS. 2 to 18. The same applies to FIG. 19, which illustrates a modification, and to FIG. 20, which illustrates a related art.

Figure 2:
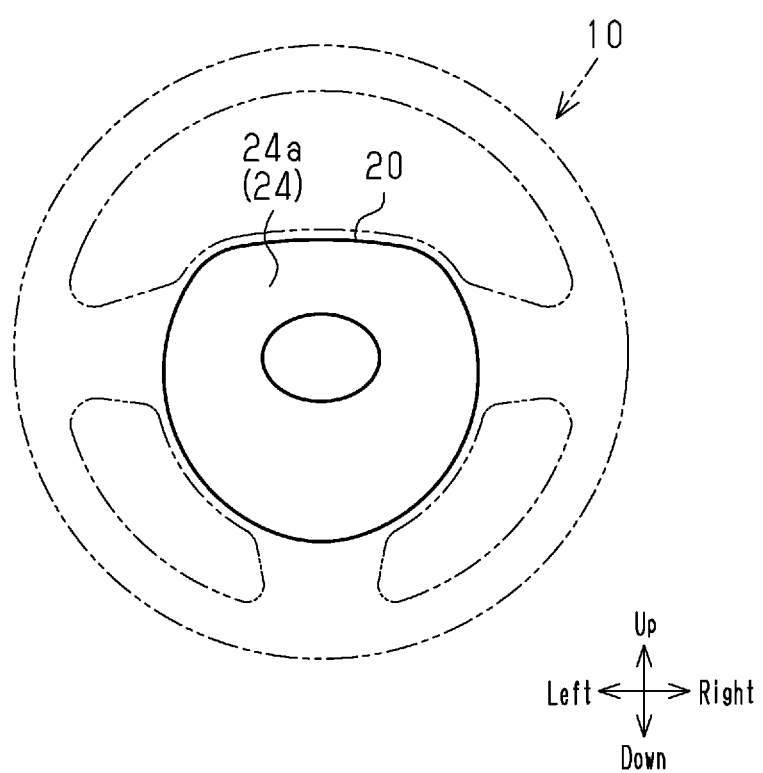
FIG. 2 is a front view of the steering wheel shown in FIG. 1.
Figure 6:
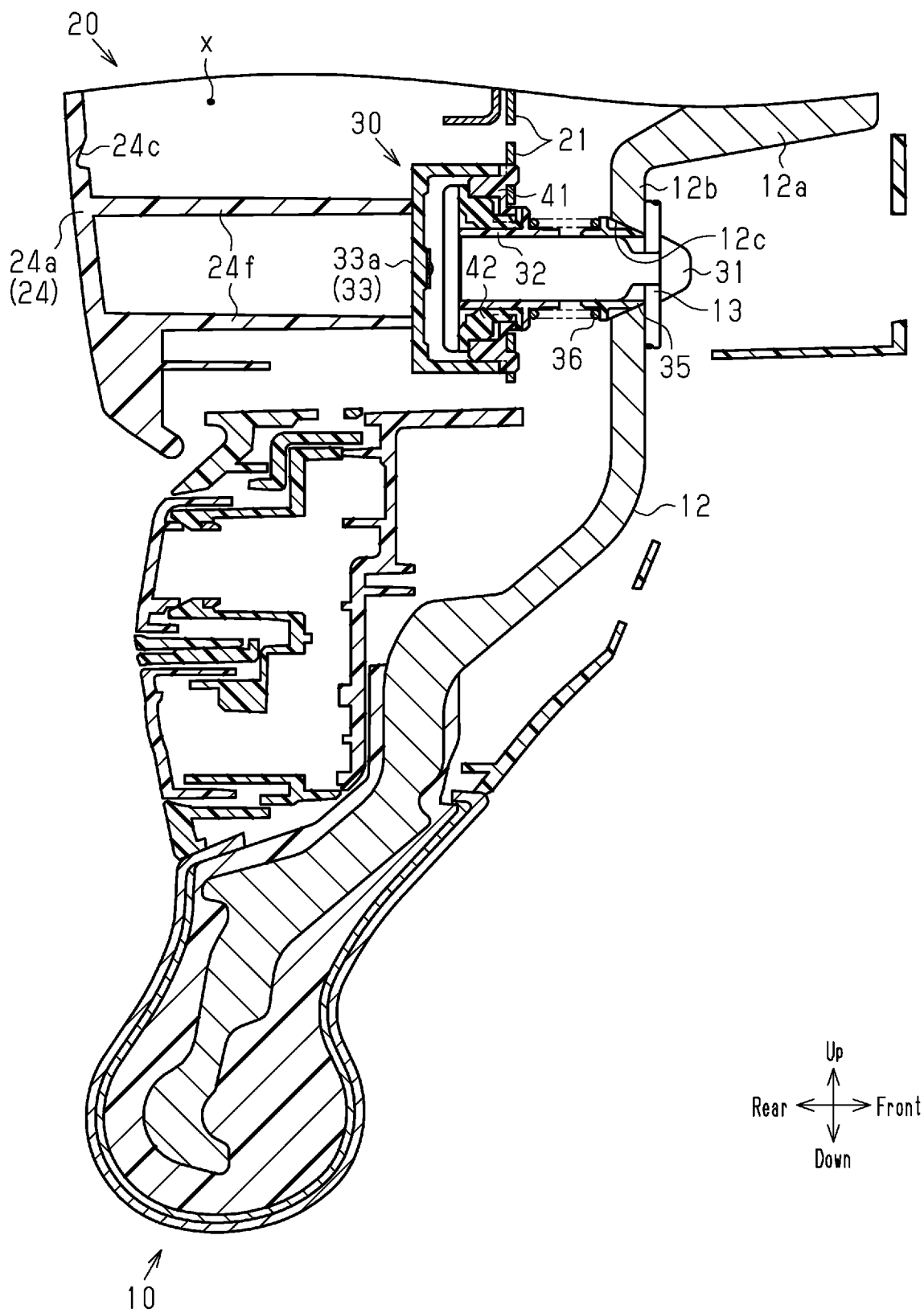
FIG. 6 is a partial vertical cross-sectional view of the steering wheel shown in FIG. 1.

As shown in FIG. 2, the steering wheel 10 includes an airbag apparatus (airbag module) 20 at the center. As shown in FIG. 6, the framework of the steering wheel 10 includes a metal core 12. The metal core 12 is made of iron, aluminum, magnesium, or an alloy thereof. The metal core 12 includes a boss 12a in a center portion. The metal core 12 is attached to the steering shaft 14 at the boss 12a (see FIG. 1), and rotates integrally with the steering shaft 14. The metal core 12 is connected to the ground GND (land vehicle body grounding).

The metal core 12 includes holding portions 12b at positions around the boss 12a. The holding portions 12b each include a through-hole 12c. The inner wall of each through-hole 12c has a tapered shape with a diameter gradually decreasing toward the front end.

Figure 11:
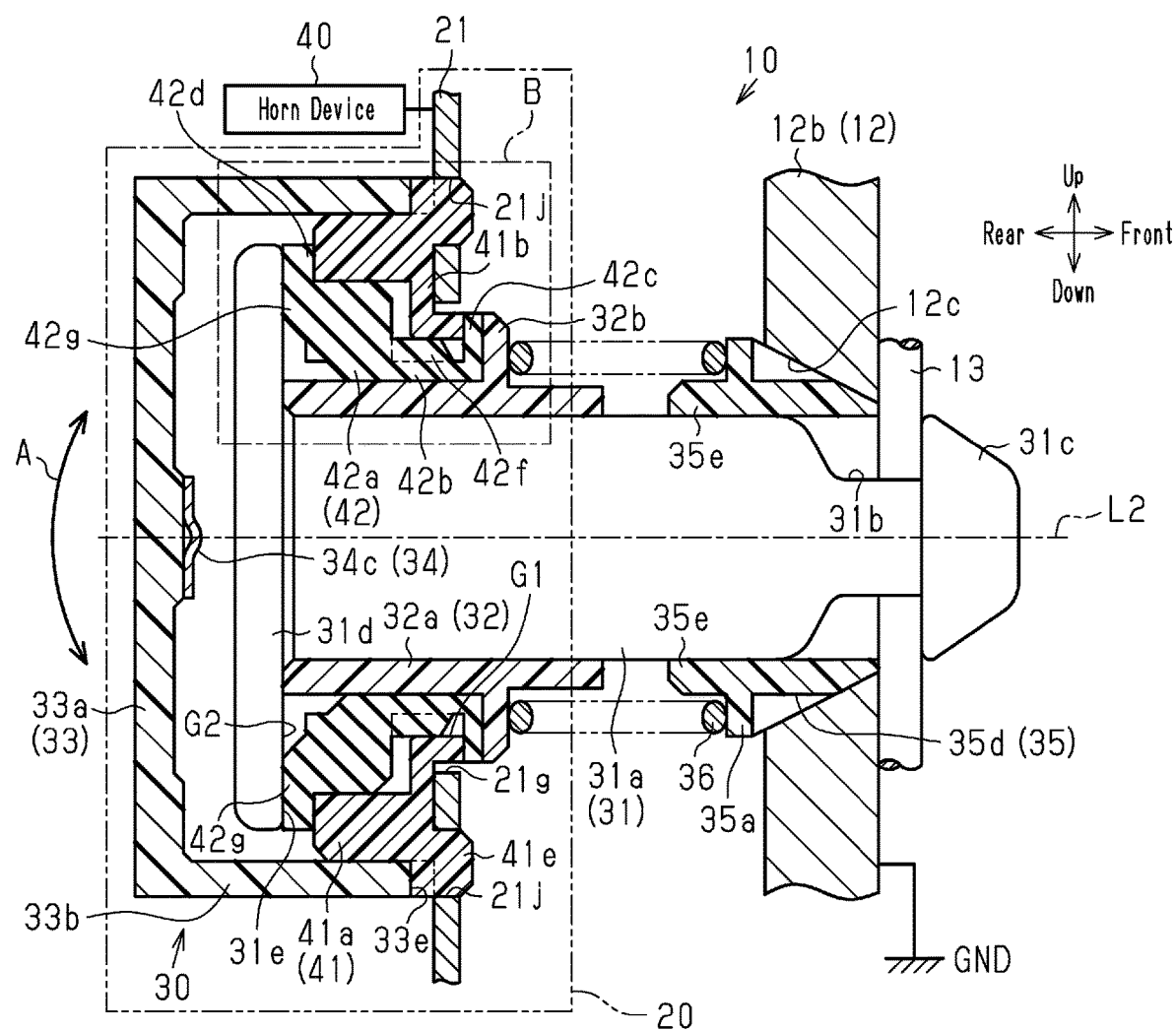
FIG. 11 is a partial vertical cross-sectional view showing the horn switch shown in FIG. 4 and its surroundings.

As shown in FIG. 11, a clip 13 is arranged in front of each holding portion 12b. The clip 13 is formed by bending a wire, made of metal such as spring steel having conductivity, into a predetermined shape. Part of each clip 13 is in contact with the metal core 12. Part of each clip 13 is located in front of the corresponding through-hole 12c.

Figure 3:
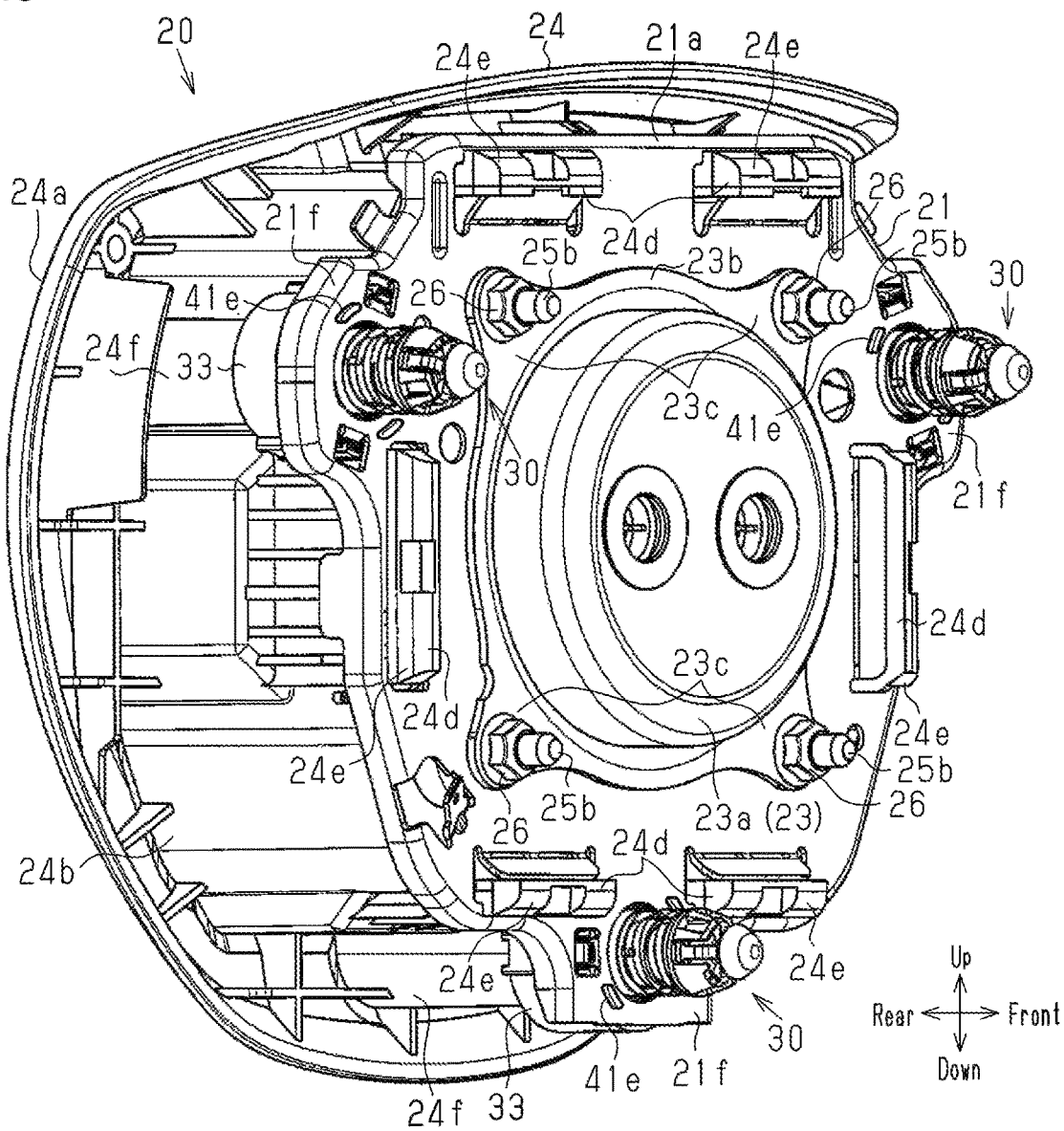
FIG. 3 is a perspective view from a diagonally forward position, illustrating the airbag apparatus of the embodiment shown in FIG. 1.
Figure 7:
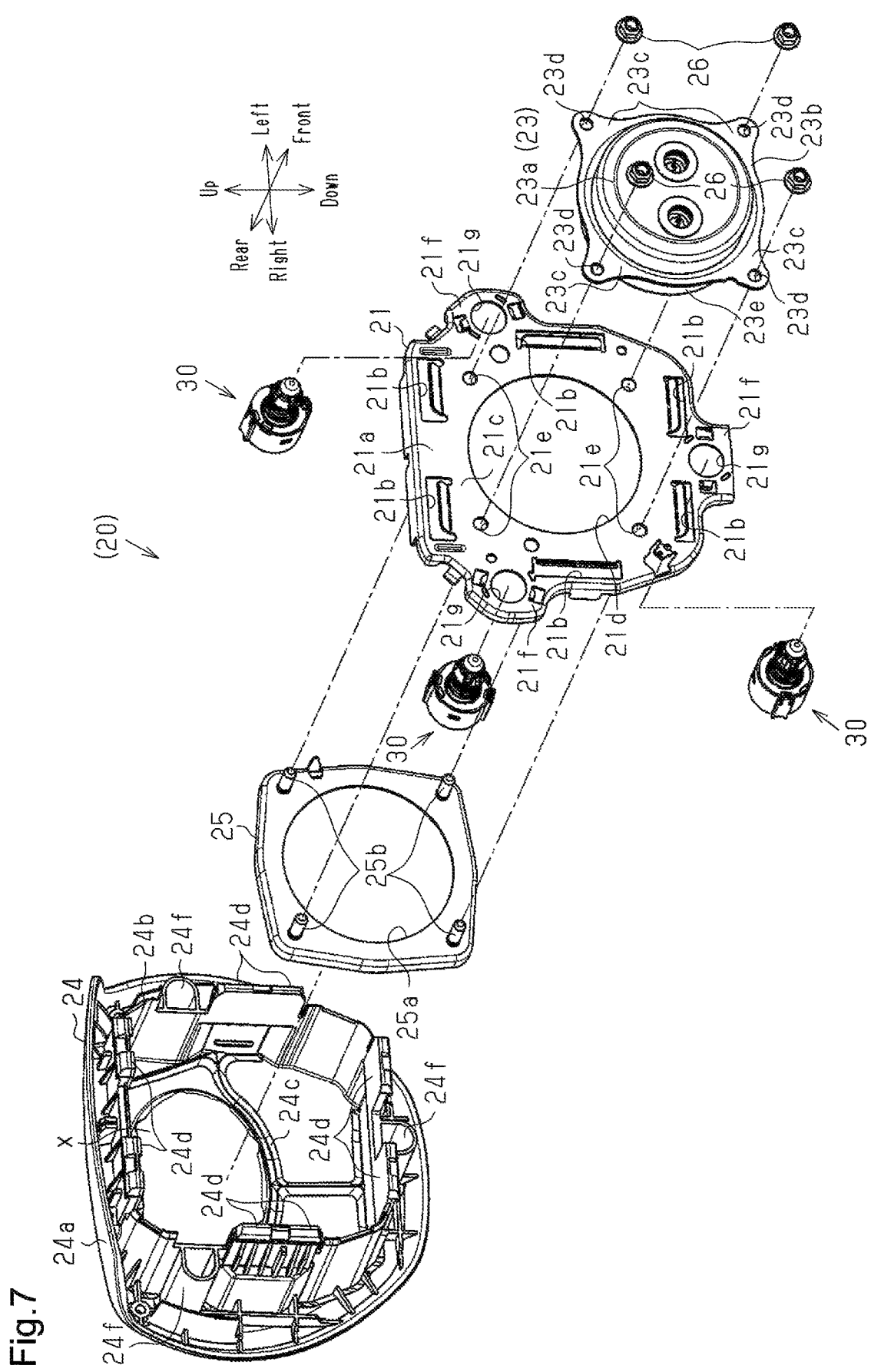
FIG. 7 is an exploded perspective view of the components of the airbag apparatus shown in FIG. 3.

The land vehicle includes a horn device 40. As shown in FIGS. 3 and 7, horn switches 30, the number of which is, for example, three, for activating the horn device 40 are each attached to the metal core 12 at the corresponding holding portion 12b by a snap-fit structure. The horn switches 30 have an identical structure. The airbag apparatus 20 is supported by the metal core 12 with these horn switches 30 in between. As described above, each horn switch 30 has a function as a support for the airbag apparatus 20 and a function of a switch for the horn device 40.

The airbag apparatus 20 includes a bag holder 21 in its front portion. Further, a damper holder 41 and an elastic member 42 are arranged between the bag holder 21 and each horn switch 30. The metal core 12, the airbag apparatus 20, the horn switches 30, the damper holders 41, the elastic members 42, and other components form a vibration suppressing structure that suppresses vibrations of the steering wheel 10. Each component of the vibration suppressing structure will now be described.

<Airbag Apparatus 20>

As shown in FIGS. 3, 6, and 7, the airbag apparatus 20 includes a pad portion 24, a ring retainer 25, an airbag (not shown), an inflator 23, and the bag holder 21. The pad portion 24, the ring retainer 25, the airbag (not shown), and the inflator 23 are attached to the bag holder 21.

The pad portion 24 has an outer cover 24a and an accommodating wall 24b. The surface (rear surface) of the outer cover 24a forms an ornamental surface. The accommodating wall 24b has a substantially rectangular and annular shape that extends from the back surface (front side) of the outer cover 24a. The space surrounded by the outer cover 24a, the accommodating wall 24b, and the bag holder 21 forms a bag accommodating space x for mainly accommodating the airbag (not shown). The outer cover 24a includes a thin portion 24c in a portion that defines the bag accommodating space x. The thin portion 24c is designed to be pushed and broken when the airbag is inflated and deployed.

The accommodating wall 24b has rectangular plate-shaped locking hooks 24d, which are formed integrally with the front end. Each locking hook 24d has a locking projection 24e, which extends away from the bag accommodating space x.

The pad portion 24 has switch support portions 24f for supporting the horn switches 30. Each switch support portion 24f is formed integrally with the accommodating wall 24b so as to extend toward the back (forward) from the outer cover 24a of the pad portion 24.

Figure 8:
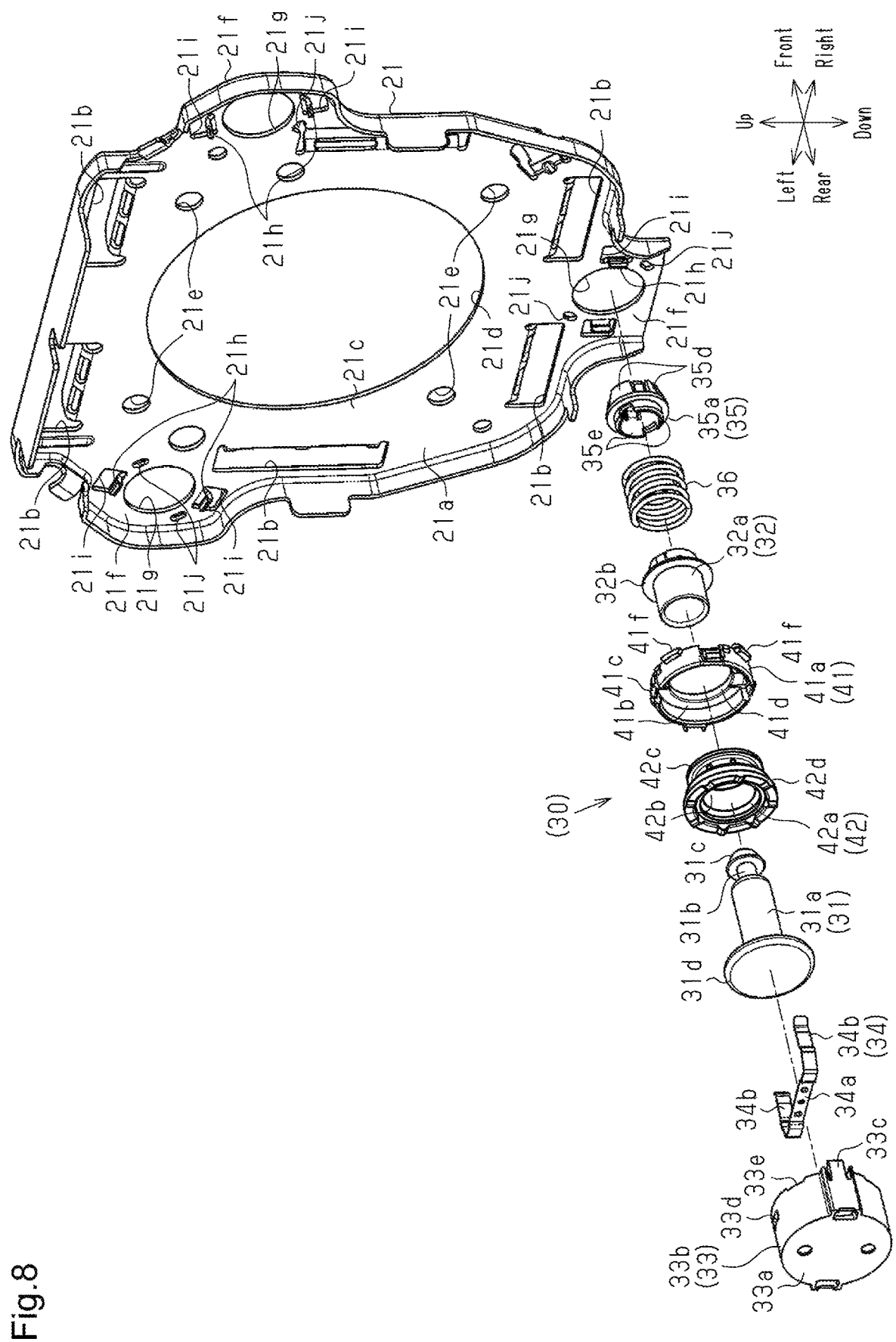
FIG. 8 is an exploded perspective view of the components of the horn switch shown in FIG. 4, together with a bag holder.

As shown in FIGS. 3, 7, and 8, the bag holder 21 is formed by pressing a metal plate having conductivity. Alternatively, the bag holder 21 may be formed by die-casting or the like using a metal having conductivity. The periphery of the bag holder 21 includes a peripheral fixing portion 21a, which has a substantially rectangular and annular shape and is used to fix the pad portion 24.

The peripheral fixing portion 21a has slit-shaped hook locking holes 21b at positions in front of the locking hooks 24d. The front ends of the locking hooks 24d are passed through the hook locking holes 21b, so that the locking hooks 24d are locked to the peripheral fixing portion 21a by the locking projections 24e.

The inner portion of the peripheral fixing portion 21a forms a base portion 21c. The base portion 21c includes a circular opening 21d in a center portion. The base portion 21c has screw insertion holes 21e in the vicinity of the periphery of the opening 21d. The inflator 23 is attached to the base portion 21c with part of the inflator 23 passed through the opening 21d.

More specifically, the inflator 23 has a short columnar main body 23a and a flange 23b on the outer circumferential surface of the main body 23a. The flange 23b has multiple attachment tabs 23c extending outward in the radial direction of the main body 23a. Each attachment tab 23c has a screw insertion hole 23d at a position forward of the corresponding screw insertion hole 21e of the bag holder 21. The inflator 23 has a gas outlet 23e for ejecting inflation gas at a position rearward of the flange 23b. The inflator 23 is inserted through the opening 21d of the bag holder 21 from the front side such that the gas outlet 23e protrudes into the bag accommodating space x. The inflator 23 is attached to the bag holder 21 together with a ring retainer 25 with the flange 23b held in contact with the periphery of the opening 21d.

More specifically, the ring retainer 25 has a circular opening 25a, which is equivalent to the opening 21d of the bag holder 21. Also, the ring retainer 25 has attaching screws 25b located at positions rearward of the screw insertion holes 21e of the bag holder 21. The opening of the airbag (not shown), which is folded so as to be deployed and inflated, is arranged between the ring retainer 25 and the bag holder 21. The attaching screws 25b of the ring retainer 25 are passed through, from the rear, screw insertion holes (not shown) provided in the peripheral portion of the airbag opening and the screw insertion holes 21e, 23d of the bag holder 21 and the inflator 23. Nuts 26 are fastened to the passed through attaching screws 25b from the front, so that the airbag is fixed to the bag holder 21 with the ring retainer 25. Also, the inflator 23 is fixed to the bag holder 21.

The peripheral fixing portion 21a of the bag holder 21 includes attachment lugs 21f, to which the horn switches 30 are attached, at several positions. The attachment lugs 21f protrude outward in the radial direction of the circular opening 21d. Each attachment lug 21f is located at a position in front of the corresponding switch support portion 24f of the pad portion 24. Each attachment lug 21f has an attachment hole 21g (see FIGS. 11 and 12). The bag holder 21 includes holding portions 21h, which are formed integrally with the bag holder 21 (see FIG. 12). The holding portions 21h are located in the vicinity of the attachment holes 21g and extend rearward. In the present embodiment, the holding portions 21h are formed by bending sections of the bag holder 21 on the opposite sides of each attachment hole 21g rearward. Since each holding portion 21h is formed through a bending action, a hole 21i (see FIG. 12) is formed on the outer side of the holding portion 21h in the radial direction of the attachment hole 21g. That is, the hole 21i is located on the opposite side of the holding portion 21h to the attachment hole 21g.

The bag holder 21 includes connection holes 21j at positions about each attachment hole 21g. The connection holes 21j are spaced apart from each other in the circumferential direction of the attachment hole 21g, and are separated from the holding portions 21h. In the present embodiment, two of the connection holes 21j correspond to each attachment hole 21g (see FIG. 11). The two connection holes 21j are on the opposite sides of the axis (not shown) of the attachment hole 21g.

<Horn Switch 30>

Figure 4:
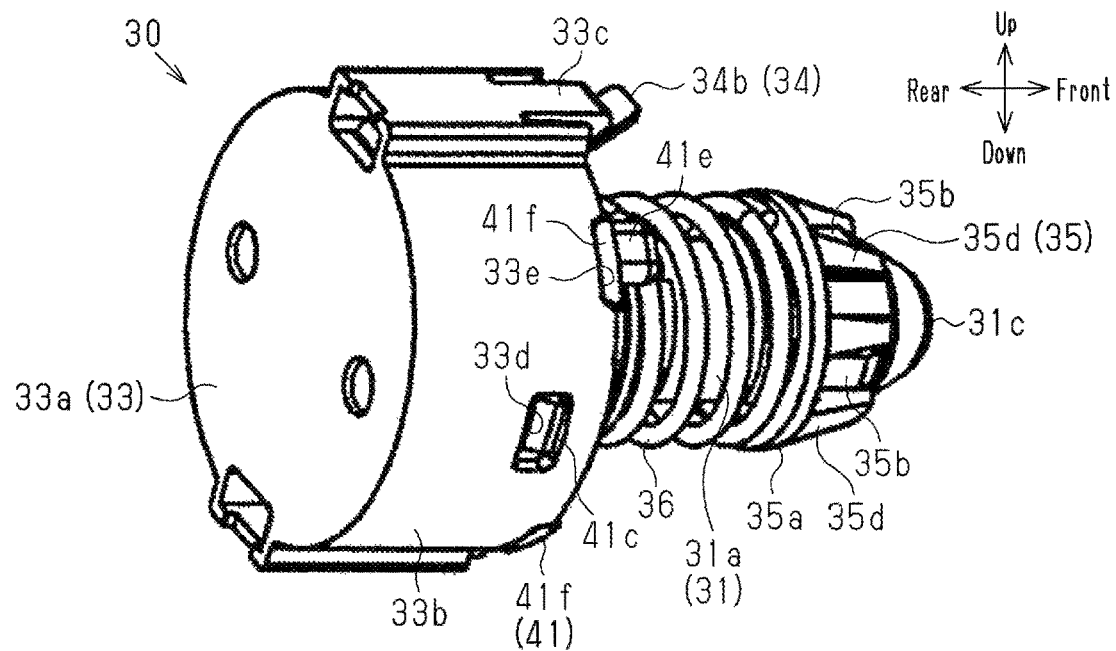
FIG. 4 is a perspective view from a diagonally rearward position, illustrating a horn switch of the embodiment shown in FIG. 1.
Figure 5:
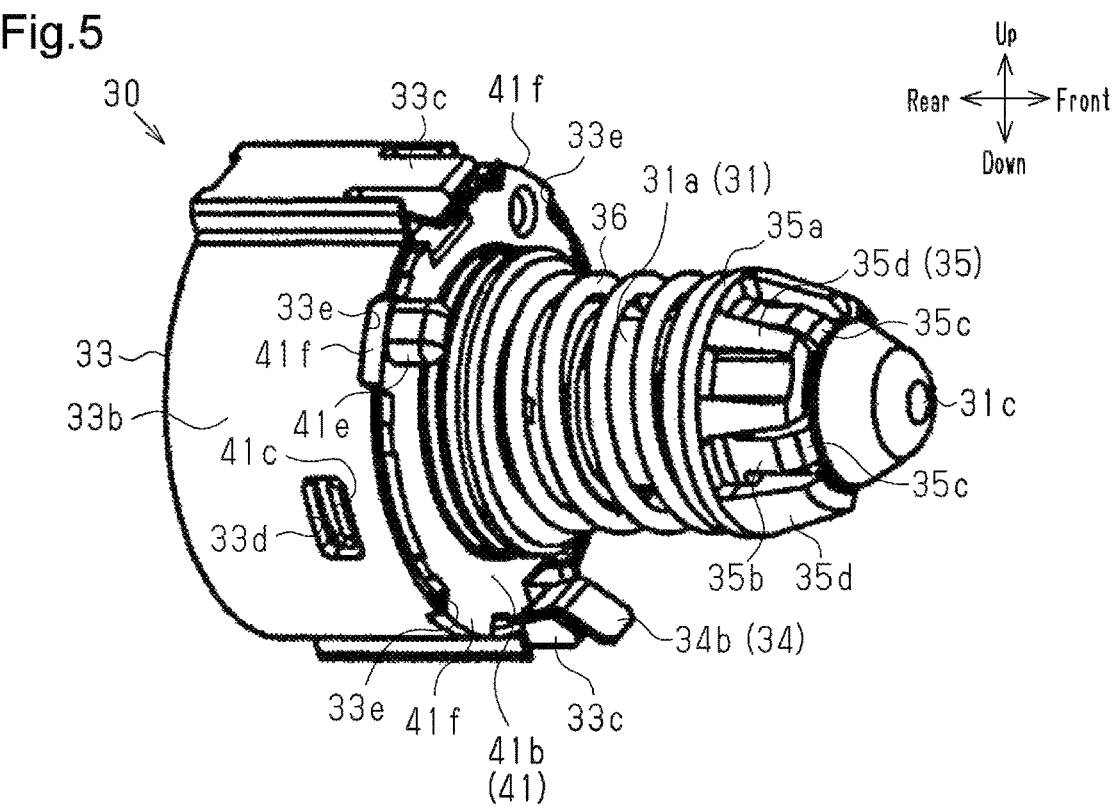
FIG. 5 is a perspective view from a diagonally forward position, illustrating the horn switch shown in FIG. 4.

As shown in FIGS. 4, 5, and 8, each horn switch 30 includes a snap pin 31, which is a supporting member, a pin holder 32, which is a slider, a contact holder 33, a contact terminal 34, a spring seat 35, and a coil spring 36. The components of each horn switch 30 will now be described.

<Snap Pin 31 (Supporting Member)>

The snap pin 31, which is illustrated in FIGS. 8, 11, and 15, is made of a metal having conductivity. The structure with which the snap pin 31 is supported by the metal core 12 will be described below. The main part of each snap pin 31 is formed by an elongated shaft portion 31a. The shaft portion 31a extends in the front-rear direction along an axis L2, which is parallel with the axis L1 of the steering shaft 14. The diameter of the shaft portion 31a is smaller than the inner diameter of the attachment hole 21g of the bag holder 21. The snap pin 31 is passed through the attachment hole 21g at the shaft portion 31a. The shaft portion 31a has an annular locking groove 31b at a position rearward of a front end 31c. The snap pin 31 has a flange 31d on the outer circumference of the rear end of the shaft portion 31a. The flange 31d has a diameter greater than that of the remaining portion of the shaft portion 31a. The outer diameter of the flange 31d is set to be greater than the inner diameter of the attachment hole 21g. Most of a front surface 31e of the flange 31d, except for the boundary with the shaft portion 31a, is orthogonal to the axis L2.

<Pin Holder 32 (Slider)>

The pin holder 32 is made of a plastic having an insulation property. The main portion of the pin holder 32 is formed by a tubular portion 32a having open front and rear ends. The tubular portion 32a is fitted around the shaft portion 31a of the snap pin 31. When the horn switch 30 is operated, the pin holder 32 functions as a slider, which slides in the front-rear direction along the shaft portion 31a.

The pin holder 32 includes a circular and annular seat portion 32b on the outer circumference of the tubular portion 32a in an intermediate portion in the front-rear direction. The seat portion 32b protrudes outward in the radial direction of the tubular portion 32a. The seat portion 32b is designed to receive the rear end of the coil spring 36. Also, the seat portion 32b is formed at a position that is located on the outer circumference of the tubular portion 32a and immediately in front of a motion transmitting portion 41d, which will be discussed below. Further, the outer diameter of the seat portion 32b is set to be greater than the dimension required for receiving the rear end of the coil spring 36. Due to the settings related to the position and outer diameter of the seat portion 32b, the seat portion 32b also serves as a motion receiving portion to which the forward motion of the damper holder 41 is transmitted through the motion transmitting portion 41d.

The motion receiving portion of the tubular portion 32a of the pin holder 32 may be provided at a location different from the seat portion 32b. The motion receiving portion may be formed integrally with the tubular portion 32a, but may be formed as a separate component.

<Contact Holder 33>

Figure 12:
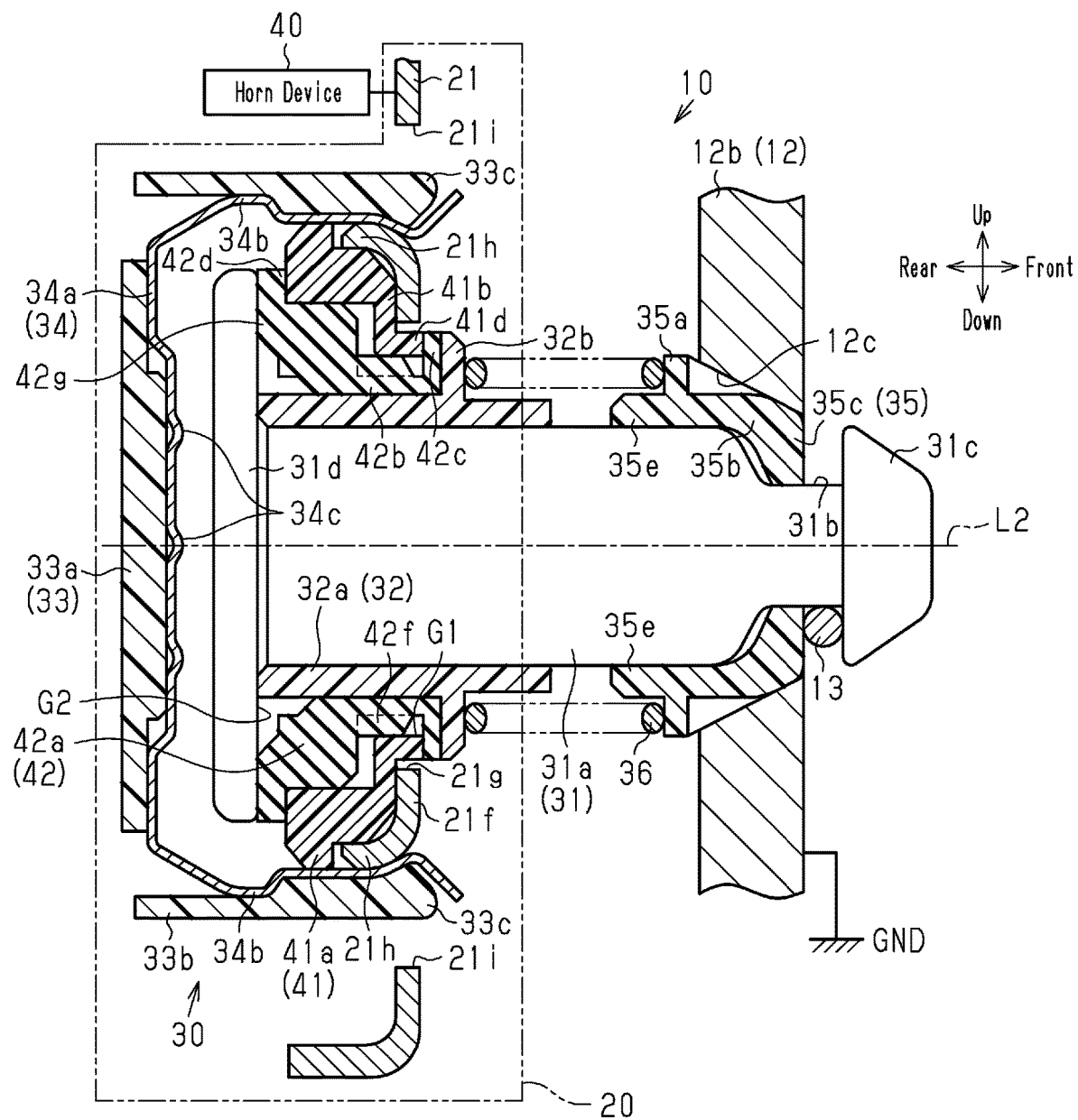
FIG. 12 is a partial vertical cross-sectional view at a position different from that of FIG. 11, showing the horn switch shown in FIG. 4 and its surroundings.

As shown in FIGS. 8 and 12, the contact holder 33 is made of a plastic having an insulation property. The contact holder 33 includes a substantially disk-shaped top plate portion 33a and a cylindrical circumferential wall 33b, which extends forward from the outer peripheral edge of the top plate portion 33a. The contact holder 33 covers at least the flange 31d of the snap pin 31 and at least the rear end of the tubular portion 32a of the pin holder 32, while being spaced apart from and located rearward of the tubular portion 32a of the pin holder 32. The contact holder 33 includes hook portions 33c at positions spaced apart from each other in the circumferential direction of the circumferential wall 33b. The hook portions 33c are elastically deformable in the radial direction.

The contact holder 33 includes engaging holes 33d (see FIGS. 4 and 5) in an intermediate portion in the front-rear direction of the circumferential wall 33b at positions spaced apart from each other in the circumferential direction. Also, the contact holder 33 includes arcuate cutouts 33e (see FIGS. 4, 5, and 15) at the front end of the circumferential wall 33b at positions spaced apart from each other in the circumferential direction.

In addition to the rear ends of the snap pin 31 and the pin holder 32, the contact holder 33 may cover portions of the snap pin 31 and the pin holder 32 that are forward of the rear ends.

<Contact Terminal 34>

The contact terminal 34 is formed by pressing a band-shaped metal plate having conductivity. The contact terminal 34 includes a main body 34a, which extends in the radial direction of the contact holder 33, and two side portions 34b, which respectively extend forward from the opposite ends of the main body 34a.

The main body 34a has contact protrusions 34c protruding forward at different positions in the longitudinal direction. Most part of the rear surface of the main body 34a excluding the contact protrusions 34c are in contact with the front surface of the top plate portion 33a of the contact holder 33.

The side portions 34b are engaged with and in contact with the inner wall surfaces of the circumferential wall 33b of the contact holder 33. This engagement allows the contact terminal 34 to be attached to the contact holder 33 while positioning the contact terminal 34.

<Spring Seat 35>

As shown in FIGS. 4, 5, and 12, the spring seat 35 is made of a plastic having an insulation property. The spring seat 35 includes a circular and annular plate-shaped seat portion 35a. The outer diameter of the seat portion 35a is set to be approximately equal to the outer diameter of the coil spring 36 and to the diameter of the rear end of the inner wall surface of the through-hole 12c, that is, the maximum diameter of the tapered inner wall surface.

The seat portion 35a includes locking sections 35b extending forward at positions spaced apart from each other in the circumferential direction. Each locking section 35b has hooks 35c projecting inward in the radial direction. The seat portion 35a includes engaging sections 35d, each of which extends forward and is located between locking sections 35b that are adjacent to each other in the circumferential direction (see FIG. 11). At least part of the outer surface of each engaging section 35d forms part of a tapered surface of which the outer diameter decreases toward the front.

Two attachment portions 35e extend rearward from the seat portion 35a (see FIG. 8). Each attachment portion 35e is curved to bulge outward in the radial direction of the seat portion 35a in correspondence with the outer shape of the shaft portion 31a of the snap pin 31.

The spring seat 35 is fitted to the shaft portion 31a of the snap pin 31 at the seat portion 35a and the attachment portions 35e. The hooks 35c enter the locking groove 31b, so that the spring seat 35 is prevented from falling off the snap pin 31. As described above, the spring seat 35 includes the multiple engaging sections 35d, which are arranged intermittently in the circumferential direction, such that each locking section 35b is placed between two of the engaging sections 35d. With this configuration, the spring seat 35 has a shape similar to a component having a tapered outer circumferential surface of which the diameter decreases toward the front end.

<Coil Spring 36>

The coil spring 36 is wound around the shaft portion 31a of the snap pin 31, the tubular portion 32a of the pin holder 32, and the attachment portions 35e of the spring seat 35. The coil spring 36 is arranged in a compressed state between the seat portion 32b of the pin holder 32 and the seat portion 35a of the spring seat 35, so as to urge the pin holder 32 rearward.

The coil spring 36 may be replaced by an urging member that is a spring different from a coil spring or by an elastic member different from a spring, as long as the urging member urges the pin holder 32 rearward.

As described above, each horn switch 30 is formed as an assembly in which separate components are unitized. That is, the snap pin 31, the pin holder 32, the contact holder 33, the contact terminal 34, the spring seat 35, and the coil spring 36 are unitized to form the horn switch 30. Accordingly, when the horn switch 30 is installed or replaced, the unitized horn switch 30 can be treated as a single assembly.

<Damper Holder 41>

Each damper holder 41 is made of a plastic having an insulation property. As shown in FIGS. 8, 11, and 15, the main portion of the damper holder 41 is formed by a circumferential wall 41a and a bottom wall 41b. The bottom wall 41b is provided at the front end of the circumferential wall 41a and functions as the bottom of the damper holder 41.

The circumferential wall 41a has a circular and annular shape, and covers part of the tubular portion 32a of the pin holder 32 in the axial direction in the contact holder 33. The circumferential wall 41a has engaging hooks 41c at multiple positions spaced apart in the circumferential direction (see FIGS. 4, 5, and 8). These engaging hooks 41c are engaged with the engaging holes 33d of the contact holder 33 from inside, so that the damper holder 41 is attached to the contact holder 33 (see FIGS. 4 and 5).

The bottom wall 41b has the shape of a circular and annular plate of which the axis agrees with the axis L2 of the snap pin 31. The inner circumference of the bottom wall 41b is positioned behind the above-described seat portion 32b (the motion receiving portion). The motion transmitting portion 41d, which has a circular and annular shape along the inner circumference of the bottom wall 41b, protrudes forward from the inner circumference. The motion transmitting portion 41*d* and the inner circumference of the bottom wall 41*b* form a minimum diameter portion of the damper holder 41. The motion transmitting portion 41*d* is passed through the attachment hole 21*g* of the bag holder 21 and is located immediately behind the seat portion 32*b* of the pin holder 32.

As shown in FIGS. 4, 5, and 15, the bottom wall 41*b* has motion transmitting protrusions 41*e* on the outer circumference at positions spaced apart from each other in the circumferential direction. Each motion transmitting protrusion 41*e* is engaged with the corresponding connection hole 21*j* of the bag holder 21 (see FIG. 8).

Engaging protrusions 41*f* are provided at multiple positions on the outer circumference of the front end of the circumferential wall 41*a*. The engaging protrusions 41*f* are spaced apart from the engaging hooks 41*c* in the circumferential direction (see FIG. 8). These engaging protrusions 41*f* are engaged with the corresponding cutouts 33*e* of the contact holder 33. This engagement determines the position of the damper holder 41 relative to the contact holder 33 in the circumferential direction. Also, the engagement of the engaging protrusions 41*f* with the cutouts 33*e* and the engagement of the engaging hooks 41*c* with the engaging holes 33*d* cause the circumferential wall 33*b* from the front and rear, so that the position of the damper holder 41 is determined in relation to the contact holder 33 in the front-rear direction (the axial direction).

The motion transmitting portion 41*d* does not necessarily need to have a circular and annular shape, but may include arcuate pieces that extend along a circle centered on the axis L2 of the snap pin 31.

<Elastic Member 42>

As shown in FIGS. 9 to 11, and 13, each elastic member 42 includes an elastic main body 42*a*, an elastic tubular portion 42*b*, and an elastic plate portion 42*c*. The elastic member 42 is arranged between the pin holder 32 and the damper holder 41. The elastic member 42 is entirely made of an elastic material such as rubber (for example, ethylene-propylene-diene copolymer (EPDM) rubber, silicone rubber, or the like), elastomer, or the like.

The elastic main body 42*a* has a circular and annular shape of which the axis agrees with the axis L2 of the snap pin 31, and forms the main portion of the rear part of the elastic member 42. The elastic main body 42*a* is spaced apart from and located rearward of the bottom wall 41*b* of the damper holder 41, which is located forward of the elastic main body 42*a*. The elastic main body 42*a* is spaced apart from and located forward of the flange 31*d* of the snap pin 31, which is located rearward of the elastic main body 42*a*.

The elastic main body 42*a* has an annular protrusion 42*d* on the outer circumference of the rear end. The annular protrusion 42*d* protrudes outward in the radial direction. The annular protrusion 42*d* is spaced apart from and located inward in the radial direction of the circumferential wall 33*b* of the contact holder 33.

The elastic tubular portion 42*b* extends forward from the inner circumference of the elastic main body 42*a*, and has a cylindrical shape of which the diameter is smaller than that of the minimum diameter portion of the damper holder 41 (the inner circumference of the bottom wall 41*b* and the motion transmitting portion 41*d*).

An annular front gap G1, which extends in the circumferential direction, is formed between the elastic tubular portion 42*b* and the minimum diameter portion of the damper holder 41. The front gap G1 is adjacent to the elastic main body 42*a*, but may be located at a position forward of and spaced apart from the elastic main body 42*a*.

Figure 16:
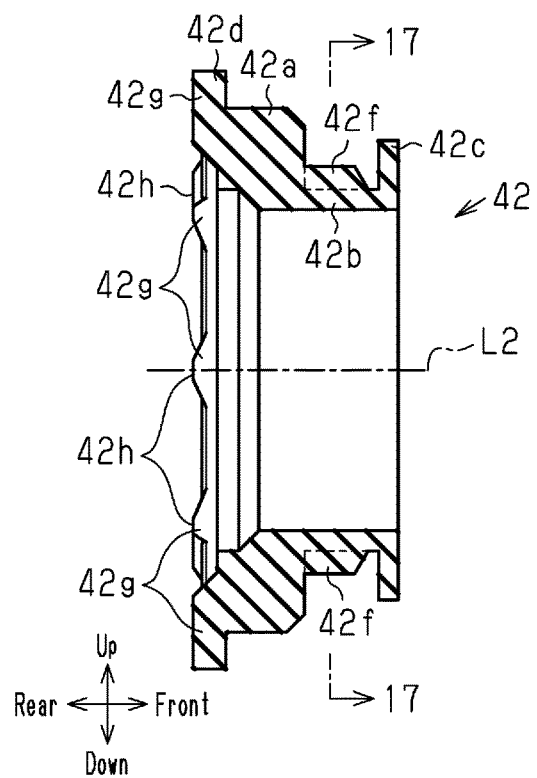
FIG. 16 is a vertical cross-sectional view of the elastic member shown in FIG. 9.
Figure 17:
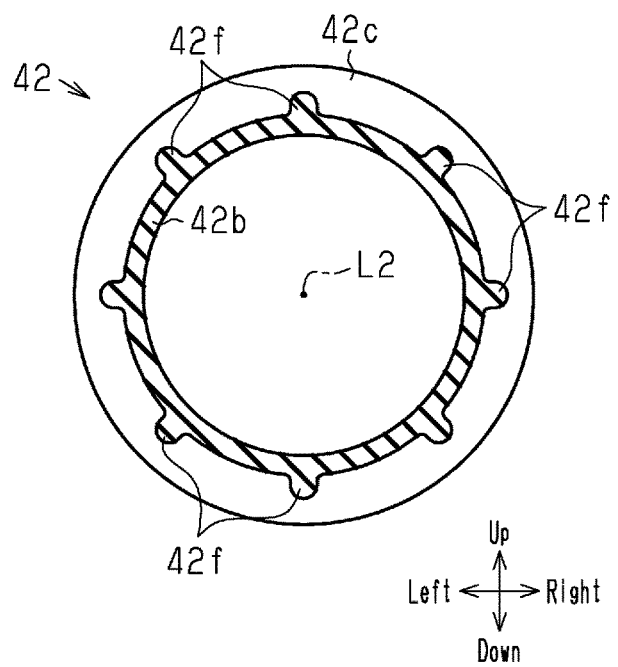
FIG. 17 is a cross-sectional view taken along line 17-17 in FIG. 16.

As shown in FIGS. 15 to 17, the elastic member 42 includes front protrusions 42*f*, which protrude outward in the radial direction of the shaft portion 31*a* from the elastic tubular portion 42*b*. The front protrusions 42*f* are formed integrally with the elastic tubular portion 42*b*. The front protrusions 42*f* are disposed at equal angular intervals in a circumferential direction of the elastic tubular portion 42*b*. The front protrusions 42*f* extend in parallel with the axis L2. The rear ends of the front protrusions 42*f* are connected to the elastic main body 42*a*. The front protrusions 42*f* contact the motion transmitting portion 41*d* of the damper holder 41 to fill part of the front gap G1. The manner of contact may be planar contact, linear contact, or point contact. The front protrusions 42*f* restrict elastic deformation of the elastic member 42 attributable to the front gap G1.

The front protrusions 42*f* may be disposed at unequal angular intervals. Also, the outer ends of the front protrusions 42*f* may contact the minimum diameter portion of the damper holder 41 while being crushed.

The elastic plate portion 42*c* protrudes outward in the radial direction from the outer circumference of the front end of the elastic tubular portion 42*b*. The outer diameter of the elastic plate portion 42*c* is set to be approximately equal to the outer diameter of the seat portion 32*b* (the motion receiving portion). The thickness of the elastic plate portion 42*c* (the dimension in the direction along the axis L2) is set to be smaller than the protruding amount of the elastic plate portion 42*c* from the elastic tubular portion 42*b*. The elastic plate portion 42*c* is disposed between the motion transmitting portion 41*d* of the damper holder 41 and the seat portion 32*b* of the pin holder 32. The front face of the elastic plate portion 42*c* is in contact with the seat portion 32*b*, and the rear surface of the elastic plate portion 42*c* is in contact with the motion transmitting portion 41*d*. Thus, the motion transmitting portion 41*d* is indirectly in contact with the seat portion 32*b* with the elastic plate portion 42*c* in between.

The elastic plate portion 42*c* does not necessarily need to be circular and annular.

Figure 9:
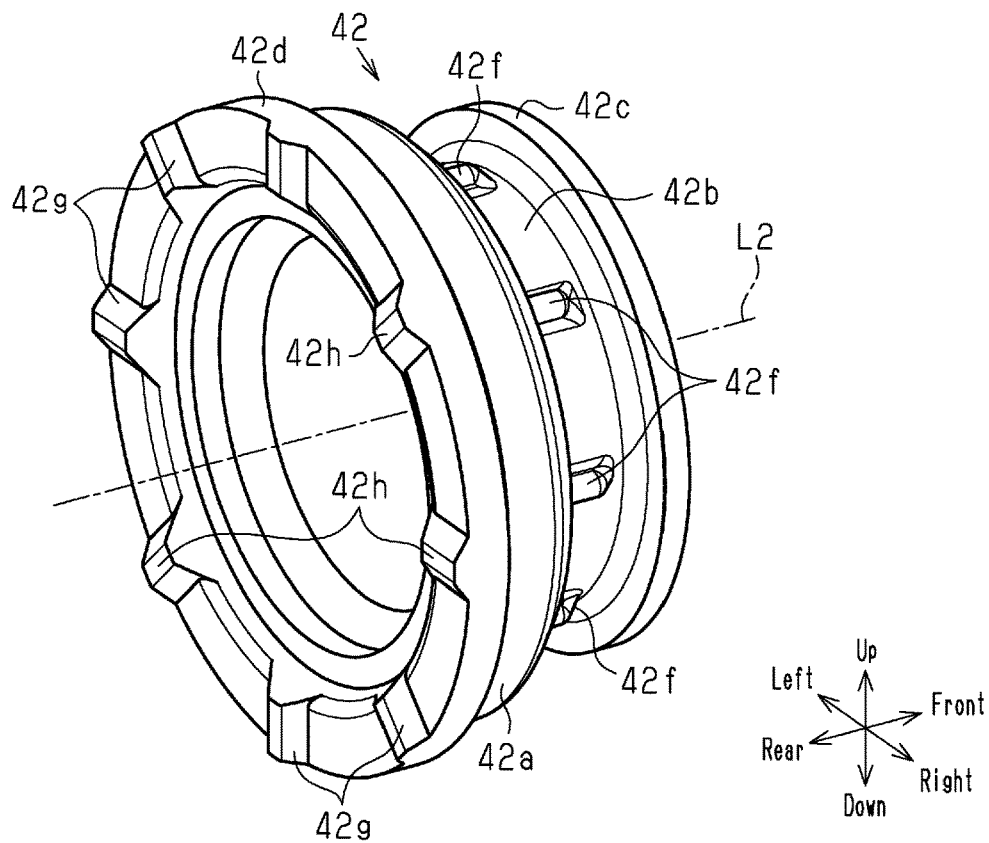
FIG. 9 is a perspective view from a diagonally rearward position, illustrating an elastic member of the embodiment.
Figure 10:
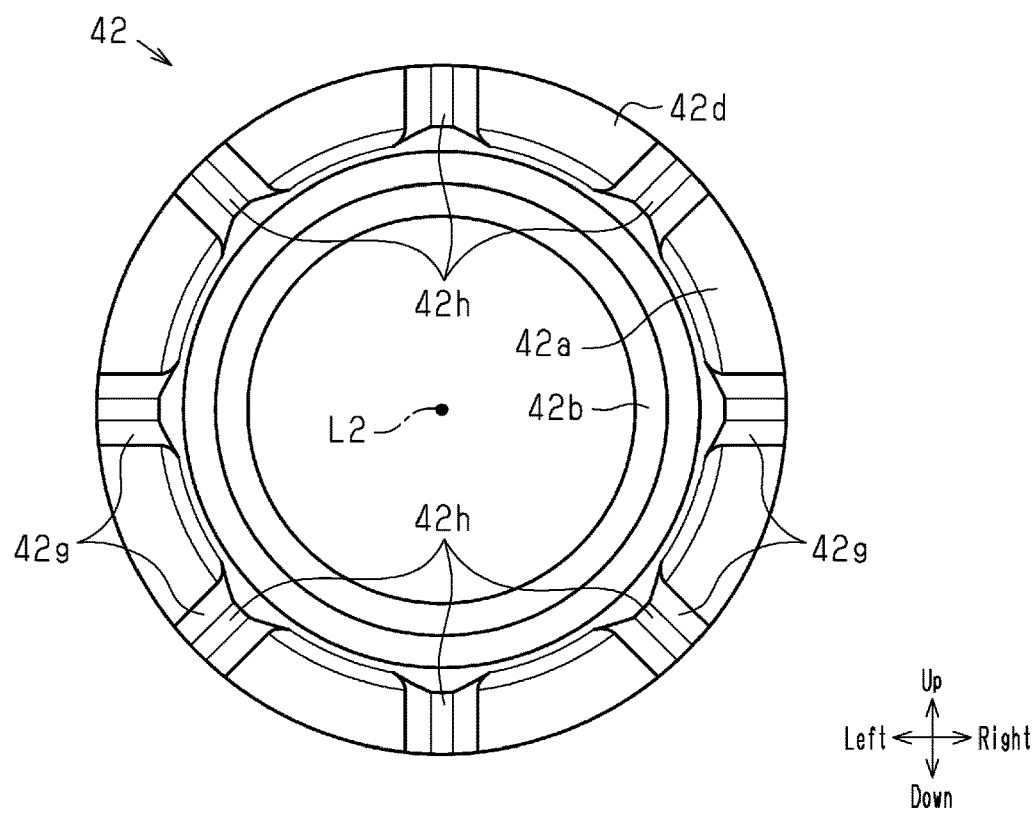
FIG. 10 is a rear view of the elastic member shown in FIG. 9.

As shown in FIGS. 9, 10, and 15, an annular rear gap G2 is formed between the flange 31*d* of the snap pin 31 and the section including the elastic main body 42*a* and the annular protrusion 42*d*, and about the shaft portion 31*a*.

The elastic member 42 has rear protrusions 42*g*, which protrude rearward from at least one of the elastic main body 42*a* and the annular protrusion 42*d*. In the present embodiment, the rear protrusions 42*g* protrude from both the elastic main body 42*a* and the annular protrusion 42*d*. The rear protrusions 42*g* correspond to the protrusions in the claims section in some embodiments.

The rear protrusions 42*g* are part of the elastic member 42 and are formed integrally with the elastic main body 42*a* and the annular protrusion 42*d*. The rear protrusions 42*g* are disposed at equal angular intervals about the axis L2. The rear protrusions 42*g* extend radially with the axis L2 serving as the center (see FIG. 10). As shown in FIGS. 13 to 15, each rear protrusion 42*g* is formed such that the dimension in the circumferential direction is maximum at the front end and minimum at the rear end. A rear surface 42*h* of each rear protrusion 42*g* includes a flat surface that is parallel with the front surface 31*e* of the flange 31*d* and extends in the circumferential direction (see FIG. 14).

The rear protrusions 42*g* may be disposed at unequal angular intervals.

The rear protrusions 42*g* contact the flange 31*d* to fill part of the rear gap G2. The rear protrusions 42*g* are brought into contact with the flange 31*d* with rear ends 42*i* of the rear protrusions 42*g* crushed. The rear end 42*i* refers to a portion of each rear protrusion 42g that is located rearward of the long-dash double-short-dash line in FIG. 14. The rear protrusions 42g restrict elastic deformation of the elastic member 42 attributable to the rear gap G2.

As shown in FIGS. 11 and 12, the elastic members 42, together with the airbag apparatus 20, form a dynamic damper. In the present embodiment, the elastic members 42 function as springs of the dynamic damper, and the airbag apparatus 20 functions as a damper mass.

The shapes and sizes of different sections of the elastic members 42 are adjusted such that the natural frequency of the elastic members 42 is set to a frequency that is the same as or close to the frequency required to suppress vibrations of the steering wheel 10 in the up-down direction or the left-right direction.

In a state in which the horn switches 30 are attached to the bag holder 21 with the elastic members 42 and the damper holders 41 in between, the pin holders 32 support the bag holder 21 such that the bag holder 21 can be moved forward and rearward relative to the snap pins 31, while preventing the snap pins 31 and the bag holder 21 from contacting each other, that is, while maintaining an insulated state. Each pin holder 32 is disposed between the shaft portion 31a of the snap pin 31 and the side portions 34b of the contact terminal 34, so as to insulate the shaft portion 31a and the side portions 34b from each other. The pin holder 32 transmits the rearward urging force of the coil spring 36 to the flange 31d of the snap pin 31.

The two holding portions 21h are disposed between the damper holder 41 and the side portions 34b of the contact terminal 34. The hook portions 33c of the contact holder 33 cause the side portions 34b to contact the outer surface of the holding portion 21h. This contact electrically connects the bag holder 21 and the contact terminal 34 to each other.

Further, the front ends of the side portions 34b, which are urged by the hook portions 33c, are locked to the holding portions 21h. The side portions 34b restrict the contact holder 33 and thus the horn switch 30 from moving rearward from the bag holder 21.

Next, the operation of attaching the airbag apparatus 20 to the metal core 12 with the horn switches 30 in between will be described.

In this operation, the snap pin 31 of each horn switch 30 is inserted from the rear into the through-hole 12c of the corresponding holding portion 12b of the metal core 12. This insertion causes the seat portion 35a of the spring seat 35 to approach the holding portion 12b, and the engaging sections 35d (see, for example, FIGS. 5 and 11) to approach the inner wall surface of the through-hole 12c. The front end 31c of the shaft portion 31a in the snap pin 31 contacts the clip 13. When the snap pin 31 is moved forward against the urging force of the clip 13, the clip 13 is elastically deformed outward in the radial direction of the snap pin 31. Then, when the snap pin 31 is moved to a position where the locking groove 31b is aligned with the clip 13, the clip 13 starts to enter the locking groove 31b due to its own elastic restoring force.

However, the hooks 35c of the spring seat 35 (see FIG. 12), which is urged forward by the coil spring 36, are in the locking groove 31b. Therefore, in the process of entering the locking groove 31b, the clip 13 enters the space between the hooks 35c and the front end 31c while compressing the coil spring 36 rearward. The entry of the clip 13 causes the hooks 35c to be located behind the clip 13 in the locking groove 31b. Part of the clip 13 that is forward of the through-hole 12c is sandwiched from the front and rear by the front end 31c and the hooks 35c, which are urged forward by the coil spring 36. When the clip 13 locks the snap pin 31 to the metal core 12, each horn switch 30 is fastened to the metal core 12, and the airbag apparatus 20 is attached to the metal core 12. The structure in which the snap pin 31 is locked to the metal core 12 by the elasticity of the clip 13 when the snap pin 31 is inserted into the through-hole 12c is referred to as a snap-fit structure.

Operation of the present embodiment will now be described. Advantages that accompany the operation will also be described.

When the airbag apparatus 20 is in a normal state, where the land vehicle is free from impact from front due to a frontal collision, inflation gas is not ejected from the gas outlet 23e of the inflator 23 (see FIG. 7), and the airbag remains folded.

When the airbag apparatus 20 is not pushed down during the normal state, the contact protrusions 34c of the contact terminal 34 are spaced apart from and located rearward of the rear end of the snap pin 31 as shown in FIGS. 11 and 12. The contact terminal 34 and the snap pin 31 are electrically disconnected from each other, so that the horn device 40 is not activated. At this time, the flange 31d of the snap pin 31, which is locked to the metal core 12 by the clip 13, receives the rearward urging force of the coil spring 36 via the pin holder 32.

Also, the forward urging force of the coil spring 36 is applied to the spring seat 35 via the seat portion 35a, so that the hooks 35c of the spring seat 35 in the locking groove 31b of the snap pin 31 push the clip 13 in the locking groove 31b forward. Due to this pushing, the clip 13 is sandwiched from the front and rear by the front end 31c and the hooks 35c, so as to be restricted from moving.

At this time, the load of the airbag apparatus 20 is mainly transmitted to the pin holder 32 via the contact holder 33, the damper holder 41, and the elastic member 42.

The rear end of the tubular portion 32a of the pin holder 32 is spaced apart from and located forward of the top plate portion 33a of the contact holder 33. The load of the airbag apparatus 20 is thus not directly transmitted to the pin holder 32 through the contact holder 33.

Therefore, when vibrations in the up-down direction and the left-right direction are transmitted to the steering wheel 10 in the normal state during high-speed traveling of the land vehicle or during idling of the land vehicle engine, the vibrations are transmitted to the airbag apparatus 20 via the metal core 12 and the horn switch 30. More specifically, the vibrations are transmitted to the contact holder 33 and the bag holder 21 via the snap pin 31, the pin holder 32, the elastic member 42, and the damper holder 41. Vibrations are transmitted between the damper holder 41 and the bag holder 21 via the above-described motion transmitting protrusions 41e and the connection holes 21j (see FIG. 15).

When receiving vibrations as described above, the airbag apparatus 20 functions as the damper mass of a dynamic damper, and the elastic members 42 function as the springs of the dynamic damper. The elastic main bodies 42a of the elastic members 42 mainly function as the springs.

Thus, the elastic members 42, mainly, the elastic main bodies 42a, vibrate in the up-down direction and the left-right direction together with the airbag apparatus 20 while being elastically deformed at the natural frequency, which is the same as or close to the frequency required to suppress vibrations of the steering wheel 10. The vibrations absorb the vibration energy of the steering wheel 10 and suppresses (dampens) the vibrations in the up-down direction and the left-right direction of the steering wheel 10.

In the steering wheel 10, the airbag apparatus 20 may swing in the direction indicated by the arrow A in FIG. 11 with respect to the snap pin 31 attached to the metal core 12.

In the present embodiment, as shown in FIG. 15, the annular front gap G1 exists between the elastic tubular portion 42b and the section including the inner circumference of the bottom wall 41b of the damper holder 41 and the motion transmitting portion 41d. The front gap G1 allows the elastic member 42 to be elastically deformed.

However, the elastic member 42 includes the front protrusions 42f, which protrude outward in the radial direction from the elastic tubular portion 42b. The front protrusions 42f partially fill the front gap G1.

The front protrusions 42f restrict elastic deformation of the elastic member 42 attributable to the front gap G1. Such restriction suppresses the above-described swinging motion of the airbag apparatus 20 relative to the snap pin 31.

Also, the rear gap G2 exists between the rear end of the elastic member 42 and the flange 31d. The rear gap G2 allows the elastic member 42 to be elastically deformed.

However, the elastic member 42 has the rear protrusions 42g, which protrude rearward from both the elastic main body 42a and the annular protrusion 42d. The rear ends 42i of the rear protrusions 42g are in contact with flange 31d. The rear protrusions 42g partially fill the rear gap G2.

The rear protrusions 42g restrict elastic deformation of the elastic member 42 attributable to the rear gap G2. Such restriction further effectively suppresses the above-described swinging motion of the airbag apparatus 20 relative to the snap pins 31.

Also, since the rear protrusions 42g are brought into contact with the flange 31d while being crushed, the rear protrusions 42g are capable of restricting elastic deformation of the elastic member 42 even if the elastic member 42 varies in shape and size.

The degree by which the rear protrusions 42g suppress elastic deformation of the elastic member 42 decreases when the volume of the portions of the rear protrusions 42g that are crushed by the interference with the flange 31d decreases, and degree increases as that volume increases. As the degree of suppression of elastic deformation increases (as the elastic member 42 becomes less likely to be elastically deformed), the natural frequency of the elastic member 42 increases.

The above-described degree of suppression is maximized when the rear protrusions 42g are formed over the entire circumference of the elastic member 42. In this case, however, it is difficult to bring the natural frequency of the elastic member 42 to close to a frequency that is the same as or close to the frequency required to suppress vibrations of the steering wheel 10.

In this regard, the rear protrusions 42g of the present embodiment are provided only at separate sections in the circumferential direction of the elastic member 42. Thus, as compared to a case in which the rear protrusions 42g are formed over the entire circumference of the elastic member 42, the degree by which the rear protrusions 42g restrict elastic deformation of the elastic members 42 is reduced, so that it is easy to bring the natural frequency of the elastic members 42 to the above-described value.

Also, in the present embodiment, as shown in FIGS. 13 to 15, the rear surface 42h of each rear protrusion 42g includes a flat surface that is parallel with the front surface 31e of the flange 31d and extends in the circumferential direction of the elastic member 42. Thus, the volume of the portions of the rear ends 42i of the rear protrusions 42g that are crushed by the interference with the flange 31d is greater than in a case in which the rear surface 42h is a curved surface. The present embodiment is thus effective for increasing the degree of suppression of elastic deformation of the elastic member 42 attributable to the rear gap G2, thereby increasing the natural frequency of the elastic member 42.

Further, in the present embodiment, the rear protrusions 42g extend radially with the axis L2 of the snap pin 31 serving as the center as shown in FIG. 10. One or more of the rear protrusions 42g extend in a direction that is the same as or close to the direction in which the airbag apparatus 20 swings. Those rear protrusions 42g continue to contact the flange 31d when the airbag apparatus 20 continues to swing regardless of the angle of the swinging motion. Thus, the present embodiment more effectively suppresses elastic deformation of the elastic member 42 using the rear protrusions 42g than in a case in which the rear protrusions 42g do not extend radially. As a result, swinging motion of the airbag apparatus 20 relative to the snap pin 31 is further effectively suppressed.

As shown in FIG. 15, when part of each front protrusion 42f is compressed in the up-down direction or in the left-right direction and elastically deformed, it starts to be elastically deformed to bulge forward. If the front protrusions 42f are in contact with the elastic plate portion 42c, which is located forward of the front protrusions 42f, the elastic plate portion 42c starts to hinder forward elastic deformation of the front protrusions 42f. Also, such contact generates frictional force between the front protrusions 42f and the elastic plate portion 42c, hindering forward elastic deformation of the front protrusions 42f.

In this regard, the front protrusions 42f are spaced apart from and located rearward of the elastic plate portion 42c in the present embodiment. The gap between the front protrusions 42f and the elastic plate portion 42c allows the front protrusions 42f to be elastically deformed forward. The front protrusions 42f are unlikely to contact the elastic plate portion 42c, so that frictional force attributable to such contact is unlikely to be generated.

When the airbag apparatus 20 is pushed down in order to activate the horn device 40, the force applied to the airbag apparatus 20 is transmitted to the contact terminal 34 and the damper holder 41 via the contact holder 33 of at least one of the horn switches 30. The force moves the damper holder 41 forward. A motion of the damper holder 41 is transmitted to the seat portion 32b (a motion receiving portion) of the pin holder 32. That is, when the motion transmitting portion 41d is moved forward, the motion is indirectly transmitted to the seat portion 32b via the elastic plate portion 42c of the elastic member 42. In addition to the function of receiving the rearward urging force of the coil spring 36, the seat portion 32b also functions as a motion receiving portion that receives a forward force transmitted from the damper holder 41 (the motion transmitting portion 41d).

Such transmission of force causes the pin holder 32 to slide forward on the shaft portion 31a against the coil spring 36. Also, the contact terminal 34 moves forward together with the contact holder 33.

Figure 18:
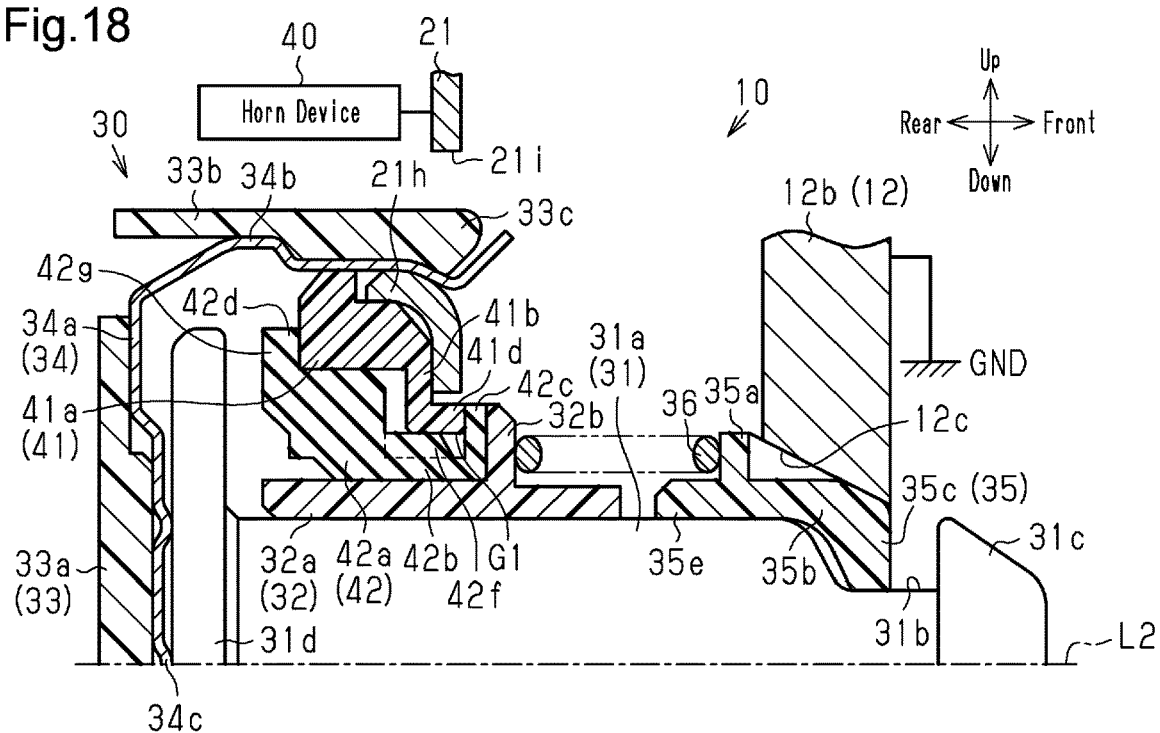
FIG. 18 is a partial vertical cross-sectional view showing the horn switch and its surroundings when the airbag apparatus is pushed down from the state shown in FIG. 12.

When at least one of the contact protrusions 34c of the contact terminal 34 comes into contact with the rear end face of the snap pin 31 as shown in FIG. 18, the bag holder 21 and the metal core 12, which is connected to the ground GND (land vehicle body grounding), are electrically connected to each other through the clip 13 (see FIG. 12), the snap pin 31, and the contact terminal 34. The electrical connection closes the circuit of the horn switch 30, so that the horn device 40, which is electrically connected to the bag holder 21, is activated.

When an impact is applied to the land vehicle, for example, due to a frontal collision, the body of the driver starts to incline forward due to the inertia. At this time, the inflator 23 of the airbag apparatus 20, which is shown in FIG. 7, is activated in response to the impact, so that inflation gas is ejected from the gas outlet 23e. The inflation gas is supplied to the airbag, deploying and inflating the airbag. When the pressing force applied to the outer cover 24a of the pad portion 24 is increased by the airbag, the outer cover 24a is ruptured at the thin portion 24c. The airbag continues to be deployed and inflated rearward through the opening formed by the rupture. The deployed and inflated airbag is located in front of the driver, whose body starts to lean forward due to the impact of the frontal collision, and restrains the forward leaning movement of the driver to protect the driver from the impact.

When the airbag is inflated rearward, a rearward force is applied to the bag holder 21. In this regard, the snap pin 31 of each horn switch 30 is supported by the metal core 12 (the holding portions 12b) in the present embodiment. The flange 31d at the rear end of each snap pin 31 is located rearward of the attachment hole 21g of the bag holder 21 (see FIG. 12). Further, the flange 31d has an outer diameter greater than the inner diameter of the attachment hole 21g. Thus, when the bag holder 21 moves rearward, the flange 31d functions as a stopper by contacting the periphery of the attachment hole 21g in the bag holder 21. Therefore, excessive rearward movement of the bag holder 21, which is accompanied by excessive rearward motion of the airbag apparatus 20, is restricted by the flange 31d of the snap pin 31.

In addition to the ones listed above, the present embodiment has the following advantages.

(1) If the rear protrusions 42g are not provided, the elastic member 42 is elastically deformed due to the rear gap G2. When the airbag apparatus 20 starts to move in the direction indicated by the arrow A in FIG. 11 with respect to the snap pin 31, the phenomenon described below may occur. The rear end of the elastic member 42, that is, the rear end of the elastic main body 42a and the annular protrusion 42d contact the flange 31d temporarily, and then separate from the flange 31d again. Also, the elastic tubular portion 42b temporarily separates from the tubular portion 32a of the pin holder 32, and then contacts the tubular portion 32a again. Also, the elastic plate portion 42c temporarily separates from the seat portion 32b of the pin holder 32, and then contacts the seat portion 32b again. Such contact and separation of the elastic member 42 with other components may generate noise.

When the force with which the airbag apparatus 20 swings relative to the snap pin 31 is great, for example, when the land vehicle is traveling on a rough road, the above-described contact occurs violently. The generated noise thus may be heard by occupants as unusual noise.

The above-described noise can be suppressed by applying a lubricant called DRYSURF to the elastic member 42. This however requires a process of applying the lubricant, increasing the number of manufacturing steps.

In this regard, the rear protrusions 42g restrict elastic deformation of the elastic member 42 attributable to the rear gap G2 in the present embodiment. Due to the restriction of elastic deformation, the rear end of the elastic member 42 is less likely to separate from the flange 31d, the elastic tubular portion 42b is less likely to separate from the tubular portion 32a, and the elastic plate portion 42c is less likely to separate from the seat portion 32b. The shape of the elastic member 42 can be modified so as to prevent the generation of noise that would be generated if the elastic member 42 contacted or separated from other components.

Since lubricant does not need to be applied to the elastic member 42, the number of manufacturing steps is not increased.

(2) The front protrusions 42f and the rear protrusions 42g are disposed at equal angular intervals about the axis L2 (see FIGS. 17 and 10).

Thus, regardless of the positions of the elastic members 42 in the circumferential direction, the front protrusions 42f and the rear protrusions 42g restrict elastic deformation of the elastic members 42.

The above-described embodiment may be modified as follows. The above-described embodiment and the following modifications can be combined as long as the combined modifications remain technically consistent with each other.

<Modifications related to Elastic Members 42>

The rear protrusions 42g may be formed on one of the elastic main body 42a and the annular protrusion 42d, as long as the rear protrusions 42g extend radially with the axis L2 serving as the center.

The shape of each rear protrusion 42g may be modified to a shape different from that in the above-described embodiment.

For example, the shape of each rear protrusion 42g may be modified such that the rear surface 42h is longer in the circumferential direction than that in the above-described embodiment, as indicated by the long-dash double-short-dash line in FIG. 13.

Figure 19:
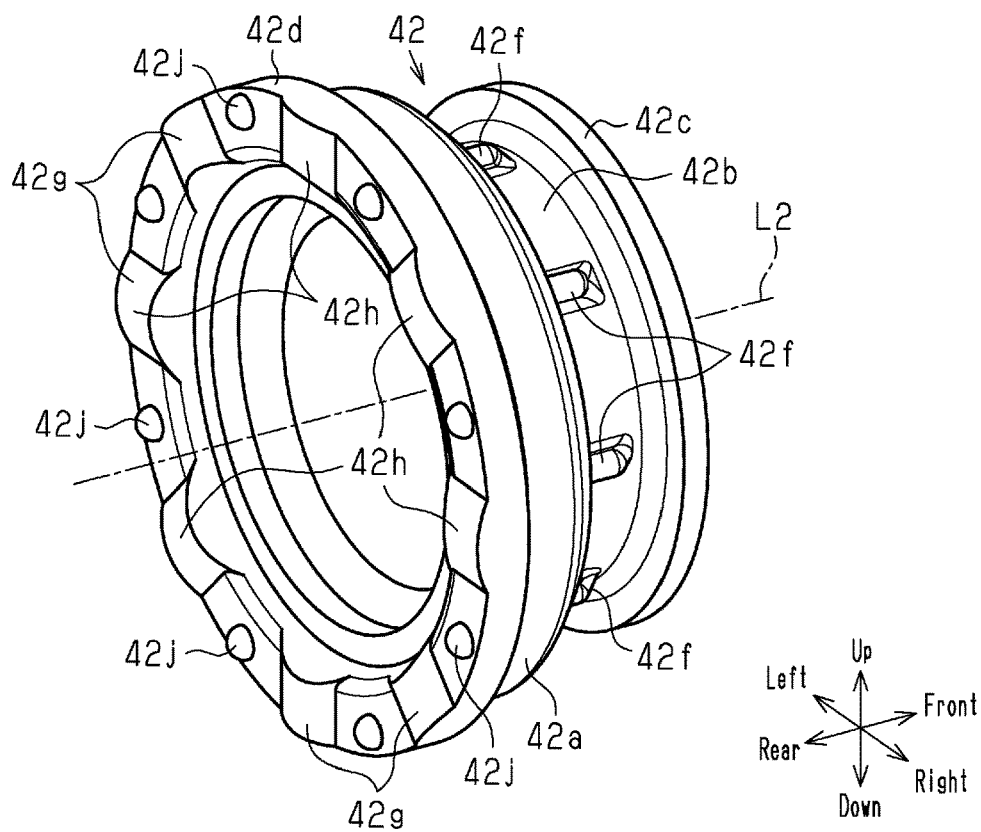
FIG. 19 is a perspective view corresponding to FIG. 9, showing an elastic member according to a modification as viewed from a diagonally rearward position.
Figure 20:
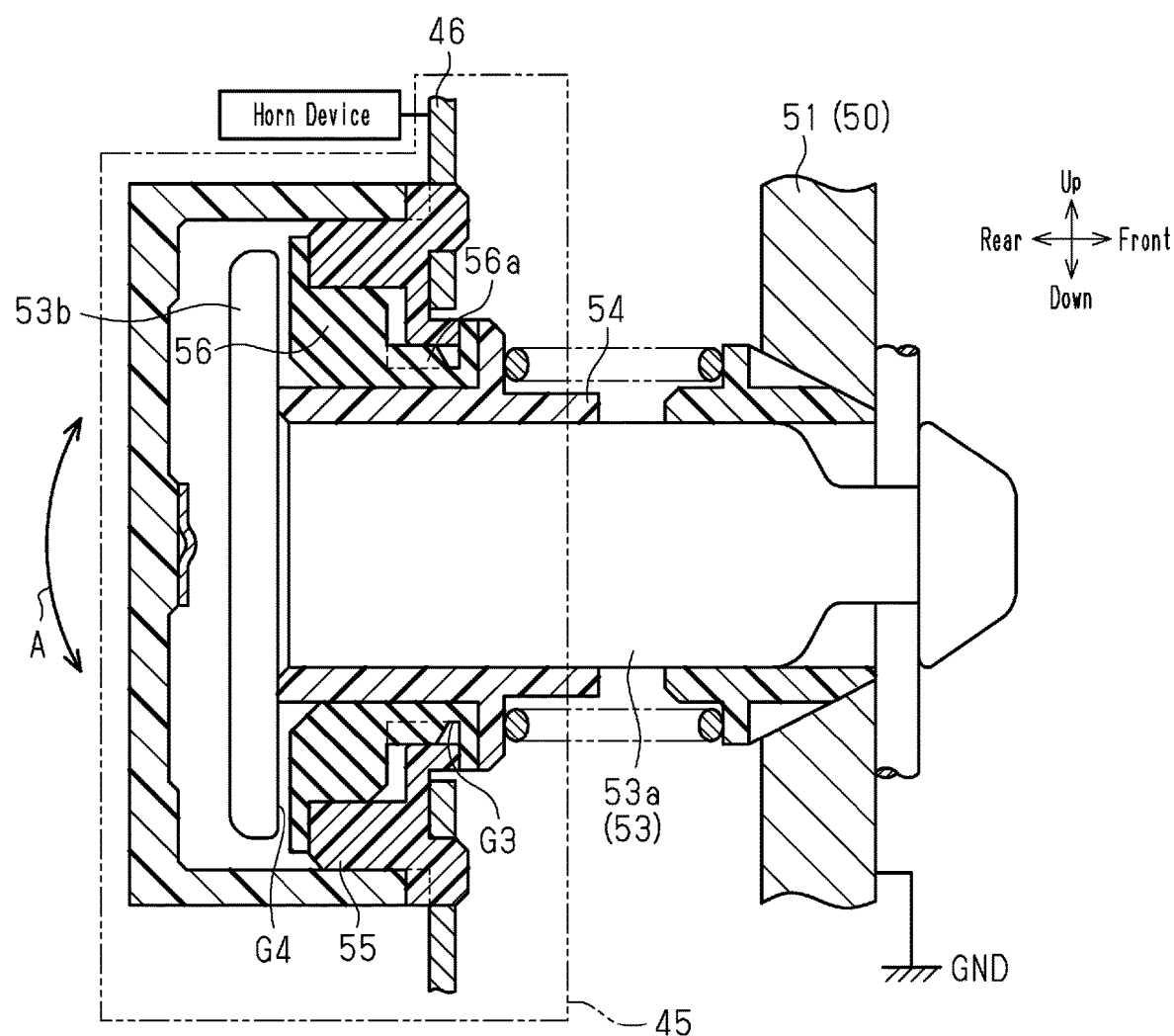
FIG. 20 is a partial vertical cross-sectional view showing a support structure for an airbag apparatus of a related art.

FIG. 19 illustrates rear protrusions 42g having a shape different from that in the above-described embodiment.

In this modification, the rear surface 42h of each rear protrusion 42g is a curved surface bulging rearward. This reduces the volume of the portion of each rear protrusion 42g that is crushed by the interference with the flange 31d. Thus, this modification is effective for reducing the degree of suppression of elastic deformation of the elastic member 42, thereby reducing the natural frequency of the elastic member 42.

The rear protrusions 42g may be provided at the same positions in the circumferential direction as the front protrusions 42f or at different positions.

If the rear protrusions 42g and the front protrusions 42f are provided at the same positions in the circumferential direction, the mold for forming the elastic member 42 is parted easily. If the rear protrusions 42g and the front protrusions 42f are provided at different positions in the circumferential direction, the front protrusions 42f suppress swinging motion of the airbag apparatus 20 in a case in which the direction in which the airbag apparatus 20 swings is different from the direction in which the rear protrusions 42g extend. The degree of suppression of swinging motion can be adjusted by changing the positions of the front protrusions 42f in the circumferential direction. Also, swinging motion in various directions can be suppressed by changing the positions of the front protrusions 42f in the circumferential direction.

As shown in the modification of FIG. 19, the elastic member 42 may include auxiliary projections 42j, each located between adjacent two of the rear protrusions 42g. The auxiliary protrusions 42j protrude rearward so as to contact the flange 31d, thereby partially filling the rear gap G2. The auxiliary protrusions 42j do not extend radially with the axis L2 serving as the center.

With this configuration, when the airbag apparatus 20 starts to swing with respect to the snap pin 31, the auxiliary protrusions 42j, together with the rear protrusions 42g, restrict elastic deformation of the elastic member 42. This allows the degree of suppression of elastic deformation of the elastic member 42 to be finely adjusted.

In FIG. 19, the auxiliary protrusions 42j are semispherical, but may have other shapes.

The auxiliary protrusions 42j of the modification shown in FIG. 19 may each be provided between adjacent two of the rear protrusions 42g on the elastic member 42 of the above-described embodiment, which is shown in FIGS. 9 and 10.

The auxiliary protrusions 42j in the modification shown in FIG. 19 may be omitted.

The front protrusions 42f may be omitted. In this case, swinging motion of the airbag apparatus 20 relative to the snap pin 31 is suppressed solely by the rear protrusions 42g.

<Other Modifications>

The support structure for an airbag apparatus may also be employed in a steering wheel of vehicles other than land vehicle, including aircraft and ships.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A support structure for an airbag apparatus, the support structure comprising:
   the airbag apparatus that includes a bag holder in its front portion and functions as a damper mass of a dynamic damper;
   a supporting member that includes a shaft portion, the shaft portion including a flange at a rear end and extending in a front-rear direction while being passed through the bag holder, the supporting member being attached to a metal core of a steering wheel at a front end of the shaft portion;
   a slider that is fitted around the shaft portion to be slidable in the front-rear direction;
   a damper holder that is attached to the airbag apparatus while covering part in the front-rear direction of the slider; and
   an annular elastic member that is arranged between the slider and the damper holder and functions as a spring of the dynamic damper, wherein
   the elastic member includes protrusions that protrude rearward from the elastic member so as to contact the flange, thereby partially filling a gap between the elastic member and the flange,
   the protrusions are spaced apart from each other in a circumferential direction of the elastic member,
   the protrusions extend radially with an axis of the supporting member serving as a center,
   each protrusion is in contact with the flange with its rear end crushed, and
   a rear surface of each protrusion includes a curved surface bulging rearward.

2. The support structure for the airbag apparatus according to claim 1, wherein
   the elastic member includes auxiliary projections, each auxiliary projection being located between adjacent two of the protrusions,
   the auxiliary protrusions protrude rearward so as to contact the flange, thereby partially filling the gap, and
   the auxiliary protrusions do not extend radially with the axis serving as a center.

3. The support structure for the airbag apparatus according to claim 1, wherein
   the gap between the elastic member and the flange is a rear gap,
   the protrusions that partially fill the rear gap are rear protrusions,
   the elastic member includes front protrusions that protrude outward in a radial direction of the shaft portion from the elastic member so as to contact the damper holder, thereby partially filling a front gap between the elastic member and the damper holder, and
   the front protrusions are spaced apart from each other in the circumferential direction.

4. A support structure for an airbag apparatus, the support structure comprising:
   the airbag apparatus that includes a bag holder in its front portion and functions as a damper mass of a dynamic damper;
   a supporting member that includes a shaft portion, the shaft portion including a flange at a rear end and extending in a front-rear direction while being passed through the bag holder, the supporting member being attached to a metal core of a steering wheel at a front end of the shaft portion;
   a slider that is fitted around the shaft portion to be slidable in the front-rear direction;
   a damper holder that is attached to the airbag apparatus while covering part in the front-rear direction of the slider; and
   an annular elastic member that is arranged between the slider and the damper holder and functions as a spring of the dynamic damper, wherein
   the elastic member includes protrusions that protrude rearward from the elastic member so as to contact the flange, thereby partially filling a gap between the elastic member and the flange,
   the protrusions are spaced apart from each other in a circumferential direction of the elastic member,
   the protrusions extend radially with an axis of the supporting member serving as a center,
   the elastic member includes auxiliary projections, each auxiliary projection being located between adjacent two of the protrusions,
   the auxiliary protrusions protrude rearward so as to contact the flange, thereby partially filling the gap, and
   the auxiliary protrusions do not extend radially with the axis serving as a center.

5. The support structure for the airbag apparatus according to claim 4, wherein each protrusion is in contact with the flange with its rear end crushed, and
   a rear surface of each protrusion includes a flat surface that is parallel with a front surface of the flange and extends in the circumferential direction.

6. The support structure for the airbag apparatus according to claim 4, wherein
   the gap between the elastic member and the flange is a rear gap, the protrusions that partially fill the rear gap are rear protrusions, the elastic member includes front protrusions that protrude outward in a radial direction of the shaft portion from the elastic member so as to contact the damper holder, thereby partially filling a front gap between the elastic member and the damper holder, and the front protrusions are spaced apart from each other in the circumferential direction.

7. A support structure for an airbag apparatus, the support structure comprising:

the airbag apparatus that includes a bag holder in its front portion and functions as a damper mass of a dynamic damper;

a supporting member that includes a shaft portion, the shaft portion including a flange at a rear end and extending in a front-rear direction while being passed through the bag holder, the supporting member being attached to a metal core of a steering wheel at a front end of the shaft portion;

a slider that is fitted around the shaft portion to be slidable in the front-rear direction;

a damper holder that is attached to the airbag apparatus while covering part in the front-rear direction of the slider; and an annular elastic member that is arranged between the slider and the damper holder and functions as a spring of the dynamic damper, wherein the elastic member includes protrusions that protrude rearward from the elastic member so as to contact the flange, thereby partially filling a gap between the elastic member and the flange, the protrusions are spaced apart from each other in a circumferential direction of the elastic member, the protrusions extend radially with an axis of the supporting member serving as a center, the gap between the elastic member and the flange is a rear gap, the protrusions that partially fill the rear gap are rear protrusions, the elastic member includes front protrusions that protrude outward in a radial direction of the shaft portion from the elastic member so as to contact the damper holder, thereby partially filling a front gap between the elastic member and the damper holder, and the front protrusions are spaced apart from each other in the circumferential direction.

8. The support structure for the airbag apparatus according to claim 7, wherein each protrusion is in contact with the flange with its rear end crushed, and a rear surface of each protrusion includes a flat surface that is parallel with a front surface of the flange and extends in the circumferential direction.

* * * * *